(12) United States Patent
Berggren et al.

(10) Patent No.: US 12,726,392 B2
(45) Date of Patent: Sep. 1, 2026

(54) PERMUTATION POLYNOMIAL INTERLEAVER/DEINTERLEAVER FOR DISCRETE FOURIER TRANSFORM SPREAD ORTHOGONAL FREQUENCY DIVISION MULTIPLEXING SIGNALS

(71) Applicant: HUAWEI TECHNOLOGIES CO., LTD., Shenzhen (CN)

(72) Inventors: Fredrik Berggren, Kista (SE); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 18/810,740

(22) Filed: Aug. 21, 2024

(65) Prior Publication Data

US 2024/0414040 A1 Dec. 12, 2024

Related U.S. Application Data

(63) Continuation of application No. PCT/EP2022/054183, filed on Feb. 21, 2022.

(51) Int. Cl.

*H04L 27/26* (2006.01)
*H04L 1/00* (2006.01)
*H04L 5/00* (2006.01)

(52) U.S. Cl.

CPC ........ *H04L 27/2627* (2013.01); *H04L 1/0071* (2013.01); *H04L 5/0007* (2013.01)

(58) Field of Classification Search

CPC . H04L 27/2627; H04L 1/0071; H04L 5/0007; H04L 27/2636

See application file for complete search history.

(56) References Cited

U.S. PATENT DOCUMENTS

2008/0051125 A1* 2/2008 Muharemovic ..... H04W 72/542 455/519
2011/0280200 A1* 11/2011 Fuchs ................ H04L 27/2647 370/329

(Continued)

FOREIGN PATENT DOCUMENTS

EP 3533195 B1 1/2021
WO 2018017225 A1 1/2018

OTHER PUBLICATIONS

Wang et al., “Frequency-interleaved DFT-spread OFDM Transmission with an Iterative Receiver,” 2009 International Conference on Wireless Communications & Signal Processing, Total 5 pages, XP031594805, Institute of Electrical and Electronics Engineers, New York, New York (Nov. 13-15, 2009).

(Continued)

*Primary Examiner* — David S Huang
(74) *Attorney, Agent, or Firm* — Leydig, Voit & Mayer, Ltd.

(57) ABSTRACT

A first communication device acting as a transmitter is configured to generate a communication signal comprising a set of interleaved discrete Fourier transform (DFT) precoded symbols which have been interleaved based on a permutation polynomial. The first communication device transmits the communication signal to a second communication device acting as a receiving device. Upon reception of the communication signal, the second communication device deinterleaves the set of interleaved DFT precoded symbols of the communication signal based on an inverse permutation polynomial.

18 Claims, 19 Drawing Sheets

(56) References Cited

U.S. PATENT DOCUMENTS

2020/0146108 A1* 5/2020 Goto ..................... H04W 72/23
2022/0368465 A1* 11/2022 Wong .................... H04L 1/1864

OTHER PUBLICATIONS

Ouyang et al., "Orthogonal chirp division multiplexing," IEEE Transactions on Communications, vol. 64, No. 9, total 12 pages (Sep. 2016).
Berggren et al., "Chirp convolved data transmission," IEEE Communication Letter, vol. 25, No. 4, total 5 pages (Apr. 2021).
Berggren et al., "Waveform Based on ZAC Sequences," total 6 pages (2021).
Stolfi et al., "Fourier transform time interleaving in OFDM modulation," IEEE 9th International Symposium on Spread Spectrum Techniques and Applications, total 6 pages (2006).
Mauritz et al., "Optimum family of spectrum-shaping functions for PAPR reduction of DFT-Spread OFDM signals," IEEE Vehicular Technology Conference, total 5 pages (2006).
Zhao et al., "On the equivalence of interleavers for Turbo codes using quadratic permutation polynomials over integer rings," IEEE Communication Letter, vol. 14, No. 3, total 3 pages (Mar. 2010).
Trifina et al., "A simple method to determine the number of true different quadratic and cubic permutation polynomial based interleavers for turbo codes," Telecommun. Syst. 64:147-171 (May 2016).
Ryu et al., "On quadratic inverses for quadratic permutation polynomials over integer rings," IEEE Trans. Inf. Theory, vol. 52, No. 3, rxiv:cs/0511060v1, total 12 pages (Nov. 2005).
Suvite et al., "On the degree of the inverse of quadratic permutation polynomial interleavers," IEEE Trans. Inf. Theory, vol. 58, No. 6, total 6 pages (2010).
Takeshita et al. , "Permutation polynomial interleavers: an algebraic-geometric perspective," IEEE Trans. Inf. Theory, vol. 53, No. 6, arxiv:cs/0601048v, total 25 pages (Jan. 2006).
Ferreira, "A group of permutations that commute with the discrete Fourier transform," IEEE Transactions on Signal Processing, vol. 42, No. 2, total 2 pages (Feb. 1994).

* cited by examiner 100
x[n]
120
N-DFT
X[k]
122
Interleaver
X[π[k]]
124
Mapper
Y[k]
126
M-IDFT
128
CP
s[n]
510
300
x[n]
320
N-IDFT
Z[π⁻¹[k]]
322
Deinter-
leaver
Z[k]
324
Demapper
R[k]
326
M-DFT
328
CP
r[n]
510

PERMUTATION POLYNOMIAL INTERLEAVER/DEINTERLEAVER FOR DISCRETE FOURIER TRANSFORM SPREAD ORTHOGONAL FREQUENCY DIVISION MULTIPLEXING SIGNALS

CROSS-REFERENCE TO RELATED APPLICATIONS

This application is a continuation of International Application No. PCT/EP2022/054183, filed on Feb. 21, 2022, the disclosure of which is hereby incorporated by reference in its entirety.

FIELD

Embodiments of the present disclosure relate to a permutation polynomial interleaver/deinterleaver for discrete Fourier transform spread orthogonal frequency division multiplexing, DFT-s-OFDM, signals.

BACKGROUND

Orthogonal frequency division multiplexing (OFDM) multiplexes modulation symbols in the frequency domain by dividing the frequency spectrum into subcarriers. Discrete Fourier transform spread OFDM (DFT-s-OFDM) is a single-carrier waveform which multiplexes modulation symbols in the time domain and, since a modulation symbol is transmitted over the whole frequency spectrum, the performance may, due to frequency diversity, be better than for OFDM on a frequency selective channel. On the other hand, for OFDM, a modulation symbol is transmitted over a part of the spectrum, i.e., a subcarrier, but over the whole OFDM symbol and the performance may, due to time diversity, be better than DFT-s-OFDM on a time selective channel.

It has been proposed to apply frequency domain interleaving for DFT-s-OFDM, i.e., the DFT precoded symbols are interleaved. The effect of this is that the single-carrier waveform is broken and the modulation symbols become multiplexed over both time- and frequency domain. Thus, there is a potential performance gain over DFT-s-OFDM and OFDM on a fading channel due to enhanced time-frequency diversity. The benefit of this method is its simplicity, and, since DFT-s-OFDM is already implemented in real-world third generation partnership project (3GPP) 4G/5G systems, introducing interleaving after the DFT precoder could be rather straightforward. On the other hand, the full potential of frequency domain interleaver is unclear, since conventional solutions do not give any insight on how to construct the interleaver and how it affects either the bit/block error rate (BER/BLER) or the peak-to-average-power-ratio (PAPR) of DFT-s-OFDM.

Another type of related conventional solution is chirp waveforms, e.g., orthogonal chirp division multiplexing (OCDM), chirp-convolved data transmission (CCDT) and zero autocorrelation sequence convolved data transmission (ZAC-S-CDT). The chirp is used as basis function, which has a linear time varying frequency that makes a modulation symbol to be transmitted over the whole bandwidth and over the whole duration of the chirp, i.e., it achieves the same property as frequency interleaving for DFT-s-OFDM. That renders in both time- and frequency diversity effects. It has been shown that these waveforms can be implemented as DFT-s-OFDM where a chirp sequence constitutes a frequency domain filter, applied after the DFT precoder. The net effect of the filtering is that the single-carrier waveform is broken and the modulation symbols become multiplexed over both time and frequency. The benefit of these waveforms is that they have been shown to outperform OFDM and DFT-s-OFDM in BER/BLER on a fading channel with large Doppler spread. The drawback of these waveforms is a higher PAPR. Moreover, the Fourier coefficients of the filter have constant magnitude but filtering requires complex-valued multiplications, which could increase the implementation complexity. These waveforms utilize a constant amplitude zero autocorrelation (CAZAC) sequence as waveform. A drawback is that such a sequence has to be selected and potentially have its parameters tuned to the fading channel. Moreover, the number of CAZAC sequences is quite limited and the sequence length can often not be chosen arbitrarily.

SUMMARY

The present disclosure provides solutions which mitigate or solve the drawbacks and problems of conventional solutions for permutation polynomial interleaver/deinterleaver for discrete Fourier transform spread orthogonal frequency division multiplexing, DFT-s-OFDM, signals.

The present disclosure describes constructing frequency domain interleavers which improve the performance for OFDM signals, such as DFT-s-OFDM signals.

According to a first aspect, there is provided a first communication device for a communication system, the first communication device being configured to:

- transform a set of modulation symbols based on a discrete Fourier transform, DFT, to obtain a set of DFT precoded symbols;
- interleave the set of DFT precoded symbols based on a permutation polynomial to obtain a set of interleaved DFT precoded symbols;
- modulate a set of subcarriers in a DFT spread orthogonal frequency division multiplexing, DFT-s-OFDM, signal with the set of interleaved DFT precoded symbols to obtain a communication signal comprising the set of interleaved DFT precoded symbols; and
- transmit the communication signal to a second communication device.

An advantage of the first communication device according to the first aspect is that the disclosed permutation polynomial interleaver provides a solution to the problem of improving the performance of DFT-s-OFDM, either for data transmission or as a reference- or synchronization signal. It further avoids the high implementation complexity and unpredictable performance of other interleaver types, e.g., pseudo-random interleavers. Further, the first communication device allows for flexible adaptation of a DFT-s-OFDM signal by selecting a proper permutation polynomial for purposes of improving data transmission, reducing PAPR or for generating reference- or synchronization signals.

In an implementation form of a first communication device according to the first aspect, the permutation polynomial $\pi(k)$ is expressed as $$\pi(k) = f(k)(\bmod N) \text{ with } f(k) = f_p k^p + f_{p-1} k^{p-1} + \dots + f_0$$

where (mod N) is the modulo-N operator, k, p, $f_p$, and N are integers, where N denotes the number of interleaved DFT precoded symbols, and where the permutation polynomial $\pi(k)$ is a p:th degree permutation polynomial permuting the values in the set {0, 1, . . . , N−1}.

An advantage with this implementation form is that the interleaver is defined by a mathematical structure, i.e., the polynomial, which can be utilized for deriving non-trivial properties of the signal that will improve its performance. Further, the permutation polynomial is a compact and simple representation of the interleaver of the first communication device, which allows for low-complexity implementation.

In an implementation form of a first communication device according to the first aspect, the first communication device is configured to interleave the set of DFT precoded symbols based on the permutation polynomial π(k) by applying the permutation polynomial π(k) to the set of N DFT precoded symbols X[k], k=0, 1, . . . , N−1, as X[π(k)], where k and N are integers, where N denotes the number of interleaved DFT precoded symbols.

An advantage with this implementation form is that a low-complex interleaving operation is performed by replacing the indices of the DFT precoded symbols by values from the permutation polynomial.

In an implementation form of a first communication device according to the first aspect, the permutation polynomial π(k) is a linear permutation polynomial.

An advantage with this implementation form is that the linear permutation polynomial can improve the PAPR and/or the BER/BLER of the DFT-s-OFDM signal.

In an implementation form of a first communication device according to the first aspect, the coefficients of the permutation polynomial are $f_1=1$ and $$f_0=\left\lfloor\frac{tN}{8}\right\rfloor+1 \text{ or } f_0=\left\lceil\frac{tN}{8}\right\rceil+1 \text{ for } t=1,3,5,7;$$

$$f_0=\left\lfloor\frac{tN}{8}\right\rfloor+1\pm p \text{ or } f_0=\left\lceil\frac{tN}{8}\right\rceil+1\pm p \text{ for } t=1,3,5,7 \text{ and an integer } p;$$

$$f_0=\left\lfloor\frac{tN}{4}\right\rfloor+1 \text{ or } f_0=\left\lceil\frac{tN}{4}\right\rceil+1 \text{ for } t=1,3;$$

$$f_0=\left\lfloor\frac{tN}{4}\right\rfloor+1\pm p \text{ or } f_0=\left\lceil\frac{tN}{4}\right\rceil+1\pm p \text{ for } t=1,3 \text{ and an integer } p;$$

where $\lfloor\cdot\rfloor$ is the floor operator, $\lceil\cdot\rceil$ is the ceiling operator, and N is an integer denoting the number of interleaved DFT precoded symbols.

An advantage with this implementation form is that the permutation polynomial can improve the PAPR and/or the BER/BLER of the DFT-s-OFDM signal.

In an implementation form of a first communication device according to the first aspect, the coefficients of the permutation polynomial are $$f_1^2\equiv 1(\text{mod } N) \text{ and } f_0=0.$$

and $f_0=0$.

An advantage with this implementation form is that the inverse permutation polynomial becomes the same as the permutation polynomial, which simplifies the implementation of the deinterleaver of the second communication device.

In an implementation form of a first communication device according to the first aspect, the permutation polynomial π(k) is an irreducible quadratic permutation polynomial.

An advantage with this implementation form is that the permutation polynomial can improve the PAPR and/or the BER/BLER of the DFT-s-OFDM signal.

In an implementation form of a first communication device according to the first aspect, the irreducible quadratic permutation polynomial fulfils:

$$\sum_{m=0}^{N-1}\sum_{n=0}^{N-1}u(|g[m,n]|)>N$$

$$g[m,n]=\frac{1}{N}\sum_{k=0}^{N-1}e^{-j\frac{2\pi}{N}m\pi(k)}e^{j\frac{2\pi}{N}nk}$$

$$u(x)=\begin{cases}1, & x>0\\ 0, & x\le 0\end{cases}$$

where k, n and N are integers, and N denotes the number of interleaved DFT precoded symbols.

An advantage with this implementation form is that the irreducible quadratic permutation polynomial can improve the PAPR and/or the BER/BLER of the DFT-s-OFDM signal.

In an implementation form of a first communication device according to the first aspect, the set of subcarriers in the DFT-s-OFDM signal is:

a set of contiguous subcarriers; or a set of equally spaced discontiguous subcarriers; or a set of non-equally spaced discontiguous subcarriers.

An advantage with this implementation form is that allocation of different sets of subcarriers can provide different properties of the DFT-s-OFDM signal, e.g., in terms of PAPR or BER/BLER.

In an implementation form of a first communication device according to the first aspect, the set of modulation symbols is generated based on a predetermined sequence.

An advantage with this implementation form is that the signal can be used as a reference- or synchronization signal generated from the predetermined sequence.

In an implementation form of a first communication device according to the first aspect, the predetermined sequence is a constant amplitude zero auto correlation sequence.

An advantage with this implementation form is that such sequences have desirable correlation properties and low PAPR.

In an implementation form of a first communication device according to the first aspect, the first communication device is configured to:

transform a first set of modulation symbols and at least one second set of modulation symbols based on a DFT to obtain a first set of DFT precoded symbols and a second set of DFT precoded symbols, wherein the first set of modulation symbols and the second set of modulation symbols are generated from the same predetermined sequence;

interleave the first set of DFT precoded symbols based on a first permutation polynomial to obtain a first set of interleaved DFT precoded symbols, and interleave the second set of DFT precoded symbols based on a second permutation polynomial to obtain a second set of interleaved DFT precoded symbols, wherein the first permutation polynomial and the second permutation polynomial are different permutation polynomials resulting in different permutations;

modulate a set of subcarriers in a DFT-s-OFDM signal with the first set of interleaved DFT precoded symbols to obtain a first communication signal comprising the first set of interleaved DFT precoded symbols, and modulate a set of subcarriers in a DFT-s-OFDM signal with the second set of interleaved DFT precoded symbols to obtain a second communication signal comprising the second set of interleaved DFT precoded symbols.

An advantage with this implementation form is that a same predetermined sequence can be used to generate multiple distinct signals.

In an implementation form of a first communication device according to the first aspect, a set of information bits are mapped to a subset of modulation symbols, wherein for each modulation symbol index m corresponding to a modulation symbol in the subset of modulation symbols, a value $$\sum_{n=0}^{N-1} u(|g[m, n]|)$$

is equal to or larger than a corresponding value for a modulation symbol index m not comprised in the subset of modulation symbols, where N is an integer denoting the number of interleaved DFT precoded symbols.

In an implementation form of a first communication device according to the first aspect, the first communication device is configured to:

transmit a control message to the second communication device, the control message indicating the permutation polynomial or its inverse permutation polynomial.

An advantage with this implementation form is that the second communication device can determine the deinterleaver to be used for receiving the DFT-s-OFDM signal.

According to a second aspect there is provided a second communication device for a communication system, the second communication device being configured to:

receive a communication signal from a first communication device, the communication signal comprising a set of interleaved DFT precoded symbols modulated on a set of subcarriers in a DFT-s-OFDM signal;

extract the set of interleaved DFT precoded symbols based on the set of subcarriers in the DFT-s-OFDM signal;

deinterleave the set of interleaved DFT precoded symbols based on an inverse permutation polynomial to obtain a set of deinterleaved DFT precoded symbols; and inverse transform the set of deinterleaved DFT precoded symbols based on an inverse DFT to obtain a set of modulation symbols.

An advantage of the second communication device according to the second aspect is that the disclosed permutation polynomial deinterleaver provides a solution to the problem of improving the performance of DFT-s-OFDM, either for data transmission or as a reference- or synchronization signal. It further avoids the high implementation complexity and unpredictable performance of other deinterleaver types, e.g., pseudo-random deinterleavers. Further, the second communication device allows for flexible adaptation of a DFT-s-OFDM signal by selecting a proper permutation polynomial for purposes of improving data transmission, reducing PAPR or for generating reference- or synchronization signals.

In an implementation form of a second communication device according to the second aspect, a degree of the inverse permutation polynomial is smaller than or equal to a degree of its associated permutation polynomial for interleaving the set of DFT precoded symbols.

The permutation polynomial is the polynomial that has been used by the first communication device for interleaving the set of modulation symbols.

An advantage with this implementation form is that the inverse permutation polynomial becomes the same as the permutation polynomial, which simplifies implementation of the deinterleaver of the second communication device.

In an implementation form of a second communication device according to the second aspect, the second communication device is configured to receive a control message from the first communication device, the control message indicating the inverse permutation polynomial or its associated permutation polynomial for interleaving the set of DFT precoded symbols.

An advantage with this implementation form is that the second communication device can determine the deinterleaver to be used for receiving the DFT-s-OFDM signal.

In an implementation form of a second communication device according to the second aspect, the inverse permutation polynomial is a linear permutation polynomial or an irreducible quadratic permutation polynomial.

An advantage with this implementation form is that these types of permutation polynomials can improve the PAPR and/or the BER/BLER of the DFT-s-OFDM signal.

According to a third aspect there is provided a method for a first communication device, the method comprises:

transforming a set of modulation symbols based on a DFT to obtain a set of DFT precoded symbols;

interleaving the set of DFT precoded symbols based on a permutation polynomial to obtain a set of interleaved DFT precoded symbols;

modulating a set of subcarriers in a DFT-s-OFDM signal with the set of interleaved DFT precoded symbols to obtain a communication signal comprising the set of interleaved DFT precoded symbols; and transmitting the communication signal to a second communication device.

The method according to the third aspect can be extended into implementation forms corresponding to the implementation forms of the first communication device according to the first aspect. Hence, an implementation form of the method comprises the feature(s) of the corresponding implementation form of the first communication device.

The advantages of the methods according to the third aspect are the same as those for the corresponding implementation forms of the first communication device according to the first aspect.

According to a fourth aspect there is provided a method for a second communication device, the method comprises:

receiving a communication signal from a first communication device, the communication signal comprising a set of interleaved DFT precoded symbols modulated on a set of subcarriers in a DFT-s-OFDM signal;

extracting the set of interleaved DFT precoded symbols based on the set of subcarriers in the DFT-s-OFDM signal;

deinterleaving the set of interleaved DFT precoded symbols based on an inverse permutation polynomial to obtain a set of deinterleaved DFT precoded symbols; and inverse transforming the set of deinterleaved DFT precoded symbols based on an inverse DFT to obtain a set of modulation symbols.

The method according to the fourth aspect can be extended into implementation forms corresponding to the implementation forms of the second communication device according to the second aspect. Hence, an implementation form of the method comprises the feature(s) of the corresponding implementation form of the second communication device.

The advantages of the methods according to the fourth aspect are the same as those for the corresponding implementation forms of the second communication device according to the second aspect.

Embodiments of the present disclosure also relate to a computer program, characterized in program code, which when run by at least one processor causes the at least one processor to execute any method according to embodiments of the present disclosure. Further, embodiments of the present disclosure also relate to a computer program product comprising a computer readable medium and the mentioned computer program, wherein the computer program is included in the computer readable medium, and may comprises one or more from the group of: read-only memory (ROM), programmable ROM (PROM), erasable PROM (EPROM), flash memory, electrically erasable PROM (EEPROM), hard disk drive, etc.

Further applications and advantages of embodiments of the present disclosure will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
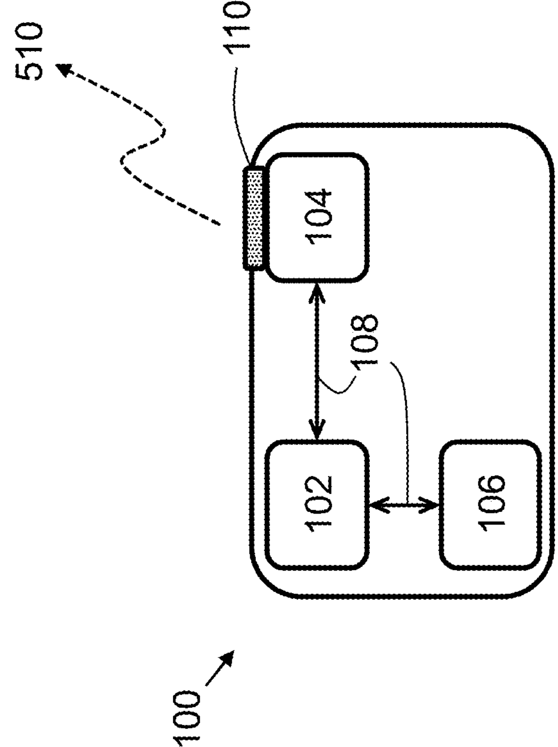
FIG. 1 shows a first communication device according to embodiments of the invention.

In the present disclosure, frequency domain interleavers for OFDM signals, such as DFT-s-OFDM, are presented which offer lower BER/BLER than conventional DFT-s-OFDM signals. By applying interleavers the present disclosure obtains lower PAPR than for conventional DFT-s-OFDM signals. Moreover, interleaving is developed for the purpose of providing sets of reference/synchronization signals through the use of multiple interleavers.

An interleaver can be represented as a sequence of integers which describes a permutation, e.g., [4 2 0 3 1]. If the integers in the sequence appear to be in a random order, and without any underlying mathematical structure, it could be denoted as a pseudo-random interleaver. For example, [4 2 0 3 1] may be obtained by a random permutation of the sequence [0 1 2 3 4]. A first issue with a pseudo-random interleaver is that its performance impact is unpredictable. In an average sense, especially if the permutation sequence is long, using a frequency domain interleaver for DFT-s-OFDM based on random permutations may lead to improved BER performance. However, according to embodiments of the present disclosure we find that certain permutation sequences do not improve the BER, but do improve the PAPR, and vice versa. Hence, within the set of permutation sequences, there are both 'good' and 'bad' ones, depending on the desired performance measure, e.g., BER or PAPR. Therefore, a pseudo-random interleaver may either result in a 'good' or 'bad' permutation sequence and its performance can generally not be predicted or guaranteed.

This leads us to consider interleavers based on permutation polynomials, which by construction could result in certain desirable signal properties.

A second issue with a pseudo-random interleaver is its implementation complexity. On the other hand, an advantage from a permutation polynomial is that the interleaving sequence could be computed in real-time, since it is represented by a closed-form expression. However, a pseudo-random interleaver does not have any analytical structure and thus it needs to be stored in memory. To interleave the subcarriers for an allocation of B resource blocks, each comprising S subcarriers, the length of the interleaver sequence is BS and each element is represented by $[\log_2 BS]$ bits, i.e., in total $BS[\log_2 BS]$ bits would be needed. For example, in a 3GPP New Radio (NR) system, a 100 megahertz (MHz) carrier has B=273 physical resource blocks (PRBs) with 30 kilohertz (kHz) subcarrier spacing and S=12 subcarriers each. Then there are BS=273*12=3276 integers for a pseudo-random interleaver. This would require $3276\lceil \log_2 3276 \rceil=39312$ bits to be stored. There should also be one interleaver for each allocation $1 \le B_0 \le B$ of $B_0$ resource blocks. Unless it is possible to guarantee that good interleavers for $B_0$ resource blocks can be generated from the long interleaver for B resource blocks, one interleaver has to be defined and stored for each allocation, resulting in $$\sum_{b=1}^{273} bS\lceil \log_2 bS \rceil = 5152968 \text{ bits,}$$

which is significant.

FIG. 1 illustrates a first communication device 100 according to an embodiment of the present disclosure. In the embodiment shown in FIG. 1, the first communication device 100 comprises a processor 102, a transceiver 104 and a memory 106. The processor 102 is coupled to the transceiver 104 and the memory 106 by communication means 108 known in the art. The first communication device 100 is configured for wireless communications in a communication system. The wireless communication capability may be provided with an antenna or antenna array 110 coupled to the transceiver 104.

The processor 102 may be referred to as one or more general-purpose central processing unit (CPU), one or more digital signal processor (DSP), one or more application-specific integrated circuit (ASIC), one or more field programmable gate array (FPGA), one or more programmable logic device, one or more discrete gate, one or more transistor logic device, one or more discrete hardware component, or one or more chipsets. The memory 106 may be a read-only memory, a random access memory (RAM), or a non-volatile RAM (NVRAM). The transceiver 304 may be a transceiver circuit, a power controller, or an interface providing capability to communicate with other communication modules or communication devices, such as network nodes and network servers. The transceiver 104, memory 106 and/or processor 102 may be implemented in separate chipsets or may be implemented in a common chipset. That the first communication device 100 is configured to perform certain actions can in this disclosure be understood to mean that the first communication device 100 comprises suitable means, such as e.g., the processor 102 and the transceiver 104, configured to perform the actions.

Figure 5:
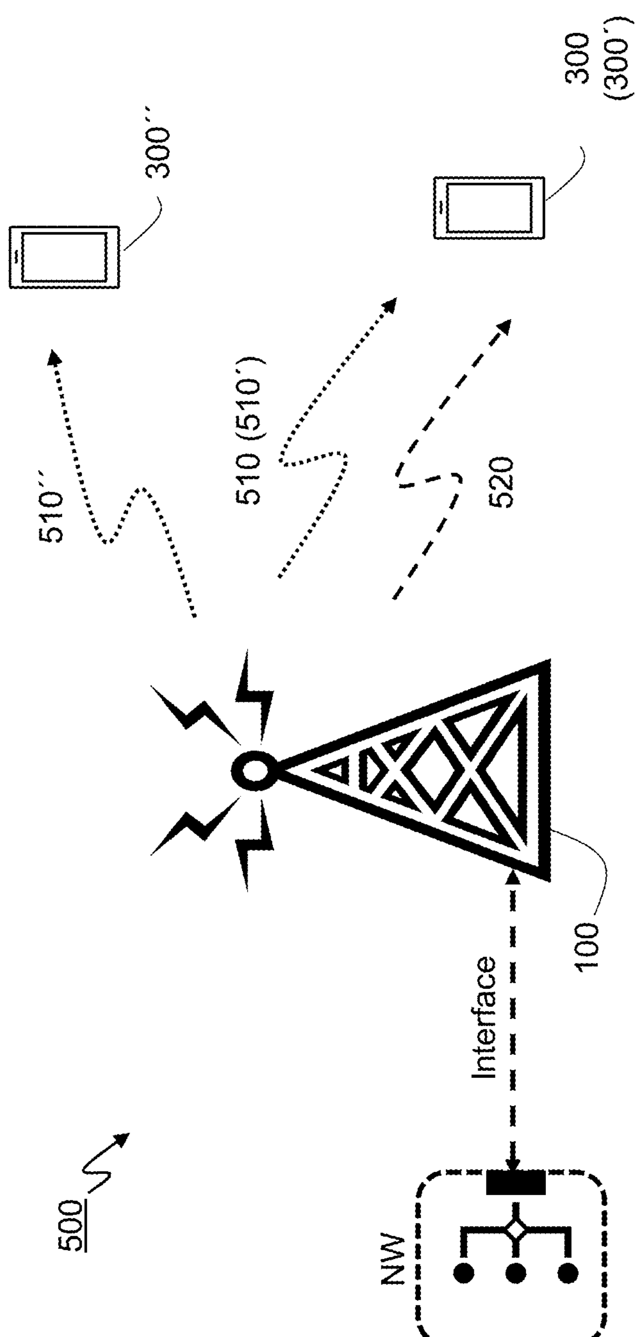
FIG. 5 shows a communication system according to embodiments of the invention.

According to embodiments of the present disclosure and with reference to FIGS. 1 and 5, the first communication device 100 is configured to transform a set of modulation symbols based on a DFT to obtain a set of DFT precoded symbols. The first communication device 100 is further configured to interleave the set of DFT precoded symbols based on a permutation polynomial to obtain a set of interleaved DFT precoded symbols. The first communication device 100 is further configured to modulate a set of subcarriers in a DFT-s-OFDM signal with the set of interleaved DFT precoded symbols to obtain a communication signal 510 comprising the set of interleaved DFT precoded symbols. The first communication device 100 is further configured to transmit the communication signal 510 to a second communication device 300.

Figure 2:
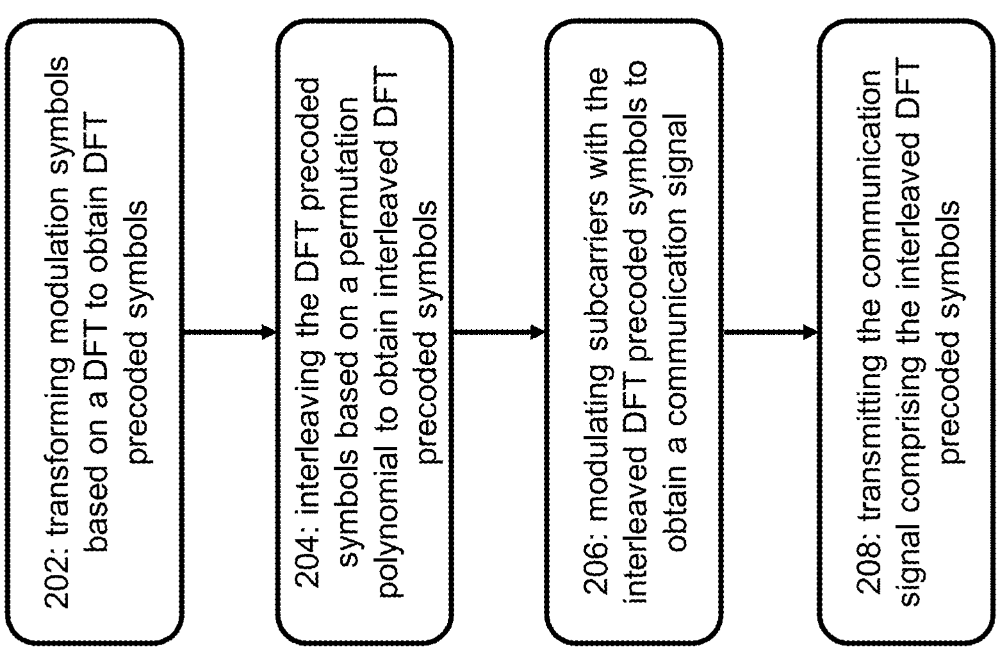
FIG. 2 shows a flow chart of a method for a first communication device according to embodiments of the invention.

FIG. 2 shows a flow chart of a corresponding method 200 which may be executed in a first communication device 100, such as the one shown in FIG. 1. The method 200 comprises transforming 202 a set of modulation symbols based on a DFT to obtain a set of DFT precoded symbols. The method 200 further comprises interleaving 204 the set of DFT precoded symbols based on a permutation polynomial to obtain a set of interleaved DFT precoded symbols. The method 200 further comprises modulating 206 a set of subcarriers in a DFT-s-OFDM signal with the set of interleaved DFT precoded symbols to obtain a communication signal 510 comprising the set of interleaved DFT precoded symbols. The method 200 further comprises transmitting 208 the communication signal 510 to a second communication device 300.

Figure 3:
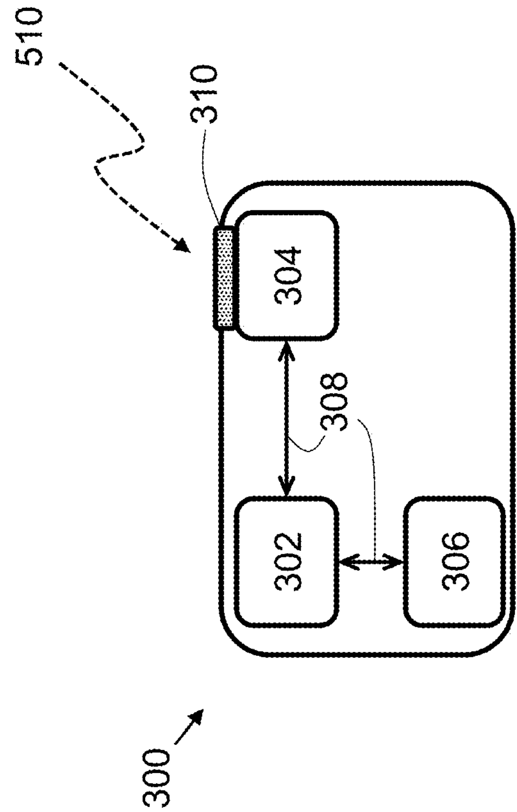
FIG. 3 shows a second communication device according to embodiments of the invention.

FIG. 3 shows a second communication device 300 according to an embodiment of the invention. In the embodiment shown in FIG. 3, the second communication device 300 comprises a processor 302, a transceiver 304 and a memory 306. The processor 302 is coupled to the transceiver 304 and the memory 306 by communication means 308 known in the art. The second communication device 300 is configured for wireless communications in a communication system. The wireless communication capability may be provided with an antenna or antenna array 310 coupled to the transceiver 304.

The processor 302 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset. The memory 306 may be a read-only memory, a random access memory (RAM), or a non-volatile RAM (NVRAM). The transceiver 104 may be a transceiver circuit, a power controller, or an interface providing capability to communicate with other communication modules or communication devices. The transceiver 304, the memory 306 and/or the processor 302 may be implemented in separate chipsets or may be implemented in a common chipset. That the second communication device 300 is configured to perform certain actions can in this disclosure be understood to mean that the second communication device 300 comprises suitable means, such as e.g., the processor 302 and the transceiver 304, configured to perform the actions.

According to embodiments of the present disclosure and with reference to FIGS. 3 and 5, the second communication device 300 is configured to receive a communication signal 510 from a first communication device 100. The communication signal 510 comprises a set of interleaved DFT precoded symbols modulated on a set of subcarriers in a DFT-s-OFDM signal. The second communication device 300 is further configured to extract the set of interleaved DFT precoded symbols based on the set of subcarriers in the DFT-s-OFDM signal. The second communication device 300 is further configured to deinterleave the set of interleaved DFT precoded symbols based on an inverse permutation polynomial to obtain a set of deinterleaved DFT precoded symbols. The second communication device 300 is further configured to inverse transform the set of deinterleaved DFT precoded symbols based on an inverse DFT to obtain a set of modulation symbols.

Figure 4:
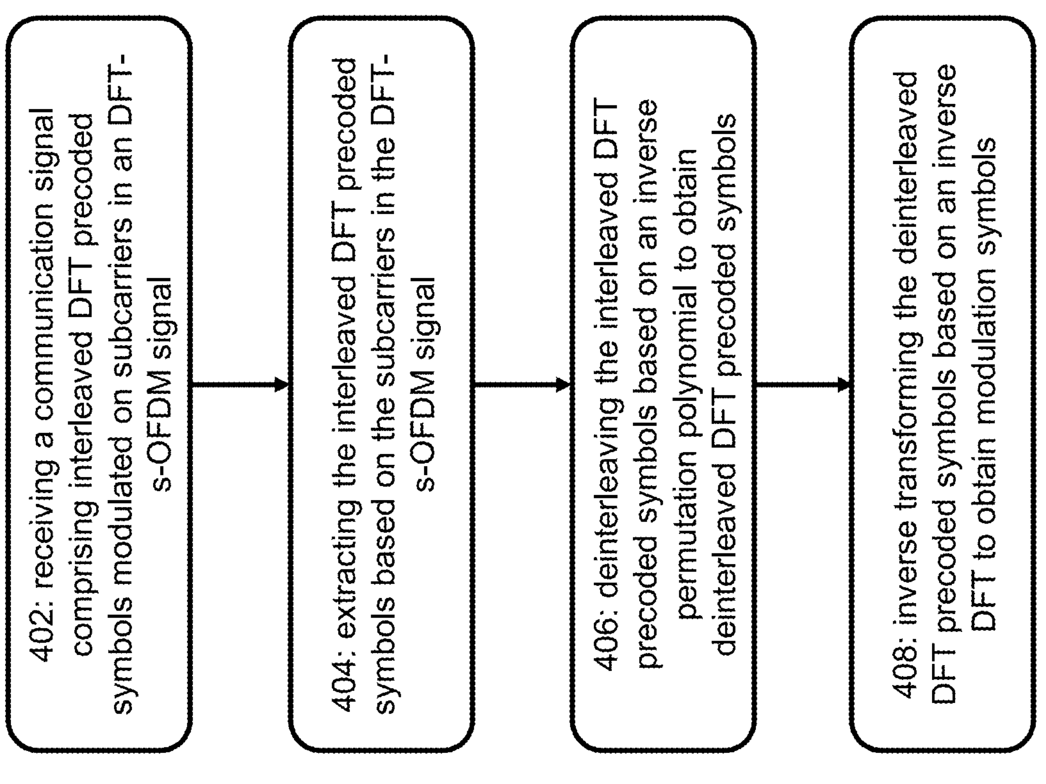
FIG. 4 shows a flow chart of a method for a second communication device according to embodiments of the invention.

FIG. 4 shows a flow chart of a corresponding method 400 which may be executed in a second communication device 300, such as the one shown in FIG. 3. The method 400 comprises receiving 402 a communication signal 510 from a first communication device 100. The communication signal 510 comprising a set of interleaved DFT precoded symbols modulated on a set of subcarriers in a DFT-s-OFDM signal. The method 400 further comprises extracting 404 the set of interleaved DFT precoded symbols based on the set of subcarriers in the DFT-s-OFDM signal. The method 400 further comprises deinterleaving 406 the set of interleaved DFT precoded symbols based on an inverse permutation polynomial to obtain a set of deinterleaved DFT precoded symbols. The method 400 further comprises inverse transforming 408 the set of deinterleaved DFT precoded symbols based on an inverse DFT to obtain a set of modulation symbols.

FIG. 5 illustrates a communication system 500 according to an embodiment of the present disclosure. The communication system 500 in the disclosed example comprises a first communication device 100 and a second communication device 300 configured to communicate and operate in the communication system 500 e.g., via a Uu interface in the downlink (DL) and in the uplink (UL). The communication system 500 may be any suitable communication system such as 3GPP 5G.

The first communication device 100 is in this particular example illustrated as a network access node of a radio access network (RAN), such as a base station, but is not limited thereto. The RAN may be coupled to a network NW such as a core network (CN) via a standardized communication interface. In more general terms, the first communication device 100 may comprise a transmitter device or in short a transmitter having the capability of transmitting communication signals in the communication system 500. The first communication device 100 may also be configured to receive communication signals in the communication system 500.

The second communication device 300 is in this particular example illustrated as a client device, such as a user equipment (UE), but is not limited thereto. In more general terms, the second communication device 300 may comprise a receiver device or in short a receiver having the capability of receiving communication signals in the communication system 500. The second communication device 300 may also be configured to transmit communication signals in the communication system 500.

In embodiments of the present disclosure, the herein disclosed solution for generating an interleaved DFT-s-OFDM signal whose time-discrete representation for sample 0≥n≥N−1 may in mathematical terms be defined by $$s[n] = \frac{1}{\sqrt{N}}\sum_{k=0}^{N-1} X[\pi(k)]e^{j\frac{2\pi}{N}nk} \tag{1}$$

where π(k) is a permutation polynomial expressed as, $$\pi(k) = f(k)(\text{mod } N) \tag{2}$$

with $$f(k) = f_p k^p + f_{p-1}k^{p-1} + \ldots + f_0 \tag{3}$$

and $$X[k] = \frac{1}{\sqrt{N}}\sum_{m=0}^{N-1} x[m]e^{-j\frac{2\pi}{N}mk} \tag{4}$$

where x[m] are a set of modulation symbols, and where (mod N) is the modulo-N operator, k, p, $f_p$ and N are integers, where N denotes the number of interleaved DFT precoded symbols, and where the permutation polynomial π(k) is a p:th degree permutation polynomial permuting the values in the set {0, 1, . . . , N−1}.

In embodiments of the present disclosure, two different types of permutation polynomials are considered in the present interleavers/deinterleavers, i.e., linear permutation polynomials (LPPs) and irreducible quadratic permutation polynomials (QPPs), respectively.

For LPPs there are two main cases that may be considered. In the first case the LPPs with the following coefficients will be described, i.e., $f_1=1$ and $$f_0 = \left\lfloor \frac{tN}{8} \right\rfloor + 1 \text{ or } f_0 = \left\lceil \frac{tN}{8} \right\rceil + 1 \text{ for } t = 1, 3, 5, 7 \tag{5}$$

$$f_0 = \left\lfloor \frac{tN}{8} \right\rfloor + 1 \pm p \text{ or } f_0 = \left\lceil \frac{tN}{8} \right\rceil + 1 \pm p \text{ for } t = 1, 3, 5, 7 \text{ and an integer } p \tag{6}$$

$$f_0 = \left\lfloor \frac{tN}{4} \right\rfloor + 1 \text{ or } f_0 = \left\lceil \frac{tN}{4} \right\rceil + 1 \text{ for } t = 1, 3 \tag{7}$$

$$f_0 = \left\lfloor \frac{tN}{4} \right\rfloor + 1 \pm p \text{ or } f_0 = \left\lceil \frac{tN}{4} \right\rceil + 1 \pm p \text{ for } t = 1, 3 \text{ and an integer } p \tag{8}$$

where $\lfloor \cdot \rfloor$ is the floor operator, $\lceil \cdot \rceil$ is the ceiling operator, and N is as aforementioned an integer denoting the number of interleaved DFT precoded symbols.

In the second case the LPPs with the following coefficients will be described, i.e., $$f_1^2 \equiv 1 \pmod N \tag{8b}$$

and $$f_0 = 0$$

For QPPs, the examples fulfilling the following conditions will be considered:

$$\sum_{m=0}^{N-1}\sum_{n=0}^{N-1} u(|g[m, n]|) > N \tag{9}$$

$$g[m, n] = \frac{1}{N}\sum_{k=0}^{N-1} e^{-j\frac{2\pi}{N}m\pi(k)} e^{j\frac{2\pi}{N}nk} \tag{10}$$

$$u(x) = \begin{cases} 1, & x > 0 \\ 0, & x \le 0 \end{cases} \tag{11}$$

where k, n and N are integers, and N as previously described denotes the number of interleaved DFT precoded symbols.

In the following disclosure implementation examples of these types of permutation polynomials will be described in detail. However, signal definitions, signal properties and mathematical insights related to the present interleavers/deinterleavers will firstly be described and explained.

Signal Definition

As aforementioned, the herein disclosed embodiments may use interleavers/deinterleavers based on permutation polynomials. These polynomials have an algebraic structure which allows for analytical treatment favorable for designing the interleaver and have benefits for low-complex implementation due to their simplicity. The polynomial $\pi(k)=f(k) \pmod N$, with $$f(k) = f_p k^p + f_{p-1}k^{p-1} + \ldots + f_0$$

and where (mod N) is the modulo-N operator, is a p:th degree permutation polynomial if it permutes the values in the set $\{0, 1, \ldots, N-1\}$. The coefficients $f_i$ are integer values. Sometimes it is convenient to make the assumption that $f_i \in \{0, 1, \ldots, N-1\}$ since $\pi(k)$ is periodic in N. The conventional DFT-s-OFDM waveform is using coefficients $f_1=1$ and $f_0=0$, i.e., there is no interleaving of the DFT coefficients and such cases of particular permutation polynomial are excluded in this disclosure. Let x[m], m=0, 1, . . . , N−1 be the set of modulation symbols which could comprise, e.g., data carried on quadrature amplitude modulated (QAM) symbols, consist of pre-determined reference symbols, etc. The modulation symbols are DFT-precoded as:

$$X[k] = \frac{1}{\sqrt{N}}\sum_{m=0}^{N-1} x[m] e^{-j\frac{2\pi}{N}mk} \tag{12}$$

Define the interleaver using the permutation polynomial $\pi(k)$ which is applied to X[k] such that the transmitted communication signal 510 for n=0, 1, . . . , N−1 becomes, $$\begin{aligned} s[n] &= \frac{1}{\sqrt{N}}\sum_{k=0}^{N-1} X[\pi(k)] e^{j\frac{2\pi}{N}nk} \\ &= \frac{1}{N}\sum_{k=0}^{N-1}\sum_{m=0}^{N-1} x[m] e^{-j\frac{2\pi}{N}m\pi(k)} e^{j\frac{2\pi}{N}nk} \\ &= \frac{1}{N}\sum_{m=0}^{N-1} x[m] \sum_{k=0}^{N-1} e^{-j\frac{2\pi}{N}m\pi(k)} e^{j\frac{2\pi}{N}nk} \\ &= \sum_{m=0}^{N-1} x[m]\, g[m, n] \end{aligned} \tag{13}$$

where the basis function is defined:

$$g[m, n] = \frac{1}{N}\sum_{k=0}^{N-1} e^{-j\frac{2\pi}{N}m\pi(k)} e^{j\frac{2\pi}{N}nk} \tag{14}$$

Optionally, a cyclic prefix of length $N_{CP}$ may be appended to the transmitted signal for $n=-N_{CP}, -N_{CP}+1, -1$.

For the remainder, we use the time-discrete signal s[n]. However, it should be understood that a lowpass equivalent time-continuous signal could be defined as $$s(t) = \sum_{k=0}^{N-1} X[\pi(k)] e^{j2\pi f_k t}$$

for $0 \le t < T$ where $f_k$ is a subcarrier frequency. The signal may be defined for $-T_{CP} \le t < T$ to include a cyclic prefix of length $T_{CP}$.

In the following disclosure, several aspects of the signal will be analyzed with reference to basis functions for providing deeper understanding of different aspects of the present disclosure. In this respect a set of properties will be formulated which are useful for constructing interleavers according to embodiments of the present disclosure. The mathematical proofs for mentioned properties are given in the Appendix section of the present disclosure.

Properties of the Basis Functions

It is straightforward to verify that the basis function for conventional DFT-s-OFDM is obtained with $\pi(k)=k$, and would be $g[m, n]=\delta[n-m]$, where $\delta[k]$ is the Kronecker delta function, defined as $\delta[0]=1$ and $\delta[k]=0$, $k\neq 0$. That is, modulation symbol x[m] is transmitted on sample m, i.e., resulting in time-multiplexing of the symbols. Thus, the basis function is sparse since only 1 out of N samples carry a symbol and the rest of the samples are zero. With the disclosed interleaver, the basis functions could still result in samples with zeros.

Property 1 (sparse basis function): If $nk-m\pi(k)$ is a permutation polynomial, then g [m, n]=0.

Figure 6:
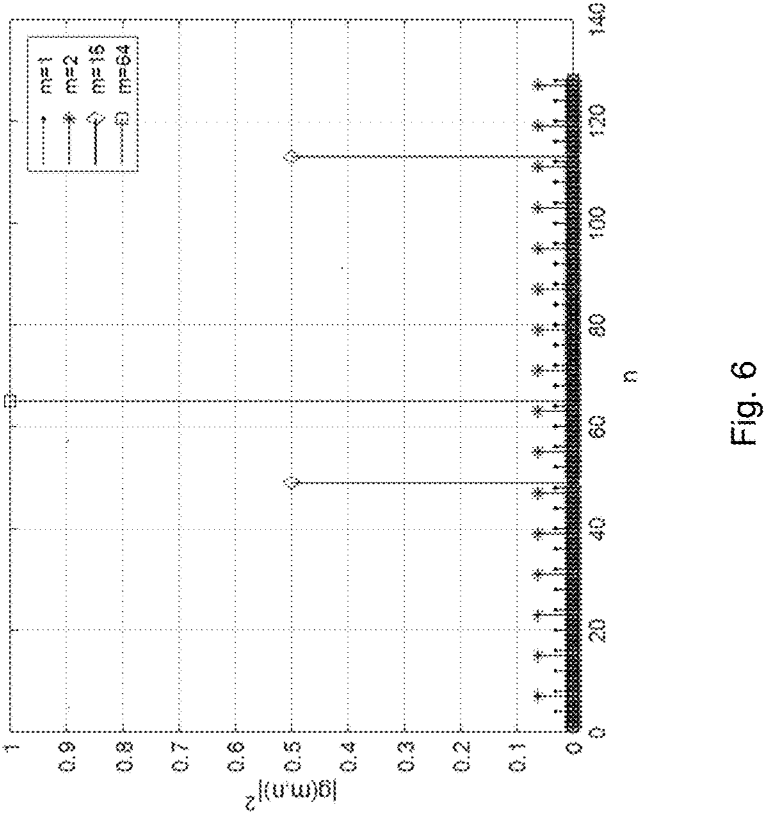
FIG. 6 shows a plot of $|g[m, n]|^2$ for m=1, 2, 16 and 64 for N=128 with $\pi(k)=2k^2+3k \pmod N$.

It should be noted that Property 1 describes a sufficient but not a necessary condition for having samples with value zero. FIG. 6 shows examples of the power of basis functions as function of time, where the number of non-zero elements differ.

An important feature is that the basis functions are orthogonal, which simplifies a receiver and basic channel equalization methods can be applied.

Property 2 (orthogonality): The basis functions are orthogonal, $$\sum_{n=0}^{N-1} g[m,n]g^*[p,n]=0,\ \text{if}\ m\neq p.$$

Moreover, the periodic autocorrelation function (PACF) for a basis function, which is defined for an integer delay d by, $$\rho_{g_m g_m}[d]=\sum_{n=0}^{N-1} g[m,n]g^*[m,n+d\ (\mathrm{mod}\ N)] \tag{15}$$

is ideal. This will be beneficial when the signal is used for time synchronization.

Property 3 (ideal PACF): The basis functions have ideal PACF, $\rho_{g_m g_p}[d]\delta[d\ (\mathrm{mod}\ N)]$.

Furthermore, the periodic crosscorrelation function (PCCF) between basis functions is defined for an integer delay d by $$\rho_{g_m g_p}[d]=\sum_{n=0}^{N-1} g[m,n]g^*[m,n+d\ (\mathrm{mod}\ N)] \tag{16}$$

and has a particularly simple expression, and is actually a basis function.

Property 4 (periodic crosscorrelation): The PCCF is a basis function, $\rho_{g_m g_p}[d]=g^*[p-m, d]$.

This means that since Property 1 states that the basis function could be sparse, so could the PCCF be. Also in this case, Property 5 is sufficient but not necessary.

Property 5 (sparse crosscorrelation): If $(p-m)\pi(k)-dk$ is a permutation polynomial, then the PCCF of the basis functions $\rho_{g_m g_p}[d]=0$.

The modulus sum of the basis functions in either time-domain or over basis functions is constant according to the following property.

Property 6 (power): The basis functions fulfill the following conditions:

$$\left|\sum_{n=0}^{N-1} g[m,n]\right|=\left|\sum_{m=0}^{N-1} g[m,n]\right|=1$$

$$\sum_{n=0}^{N-1}|g[m,n]|^2=\sum_{m=0}^{N-1}|g[m,n]|^2=1$$

Properties of the Signal

Suppose a signal $s_i[n]$ is generated according to (13) using the modulation sequence $x_i[n]$. The PCCF of signal $s_1[n]$ and $s_2[n]$ is defined by $$\rho_{s_1 s_2}[d]=\sum_{n=0}^{N-1} s_1[n]s_2^*[n+d\ (\mathrm{mod}\ N)] \tag{17}$$

and for the sequences of modulation symbols $x_1[n]$ and $x_2[n]$, defined by:

$$\rho_{x_1 x_2}[d]=\sum_{n=0}^{N-1} x_1[n]x_2^*[n+d(\mathrm{mod}\ N)] \tag{18}$$

The relation between the PCCFs and the basis functions, and hence implicitly the interleaver, is given by the following property.

Property 7 (signal PACF and PCCF): The PCCF is $$\rho_{s_1 s_2}[d]=\sum_{n=0}^{N-1}\rho_{x_1 x_2}[n]g*[n,d].$$

As a special case, it can be shown that the crosscorrelation value at zero delay is the same for the signal $s_1[n]$ and $s_2[n]$, and for the modulation symbols $x_1[n]$ and $x_2[n]$, as given by Property 8.

Property 8 (signal crosscorrelation): The crosscorrelation of signals is the same as for the modulation symbols, $P_{s_1 s_2}[0]=P_{x_1 x_2}[0]$.

In embodiments of the present disclosure, the set of modulation symbols is generated based on a predetermined sequence. For synchronization purposes, a particularly useful class of modulation sequences are the so-called constant amplitude zero autocorrelation (CAZAC) sequences. Such a sequence is characterized by that it has a constant amplitude (CA) property and that it has a zero autocorrelation (ZAC) property, i.e., that its PACF is ideal. These are defined by (19) and (20), where C is a constant:

$$|x[m]|=C \tag{19}$$

$$\sum_{n=0}^{N-1} x[n]x^*[n+d(\mathrm{mod}\ N)]=NC^2\delta[d(\mathrm{mod}\ N)] \tag{20}$$

A benefit is that the ZAC is maintained for the signal (13), if the input sequence has a ZAC.

Property 9 (ZAC): If x[m] is a ZAC sequence, then s[n] is a ZAC sequence.

Linear Permutation Polynomial Interleavers

As aforementioned, in embodiments of the present disclosure, the permutation polynomial $\pi(k)$ may be an LPP i.e., $f_i=0$, $i>1$. Such an interleaver results in permuted DFT-s-OFDM signal samples.

Property 10 (LPP interleaver): If $f_i=0$, $i>1$, s[n] is a time-interleaved and phase modulated DFT-s-OFDM signal.

According to the proof of Property 10, the time-interleaved and phase modulated signal becomes, $$s[n]=x\left[nf_1^{-1}(\mathrm{mod}\ N)\right]e^{-j\frac{2\pi}{N}nf_1^{-1}f_0} \tag{21}$$

where $$f_1^{-1}$$

is the inverse of $f_1$ modulo N.

By using (21), the PACF could be derived as shown in this property.

Property 11 (PACF with LPP interleaver): If $f_i=0$, $i>1$, the modulus PACF is $$|\rho_{ss}[d]| = \left|\sum_{n=0}^{N-1} x\left[nf_1^{-1}(\text{mod } N)\right]x^*\left[(n+d)f_1^{-1}(\text{mod } N)\right]\right|.$$

It then follows that the signal (13) has CAZAC property, if that is also the case for the modulation symbol sequence.

Property 12 (CAZAC for LPP): If $f_i=0$, $i>1$ and if $x[m]$ is a CAZAC sequence, then $s[n]$ is a CAZAC sequence.

Quadratic Permutation Polynomial Interleavers

As aforementioned in further embodiments of the present disclosure, the permutation polynomial $\pi(k)$ is an irreducible quadratic permutation polynomial (QPP). With a QPP interleaver the signal becomes, $$s[n] = \frac{1}{N}\sum_{m=0}^{N-1} x[m]e^{-j\frac{2\pi}{N}f_0 m}\sum_{k=0}^{N-1} e^{j\frac{2\pi}{N}k(n-mf_1-kmf_2)} \tag{22}$$

where the inner sum is a generalized quadratic Gauss sum. It is considerably more difficult to determine the correlation properties of this particular signal than when an LPP is used in the interleaver. The signal (13) still has the ZAC according to Property 10, albeit it is generally complicated to show the CA property of s[n] without making assumptions on a particular modulation sequence x[m]. Nevertheless, evaluation using different types of CAZAC sequences x[m] has shown that the signal (13) generally appears to maintain the CAZAC property. This property is desirable for reference- or synchronization signals, thus, a QPP interleaver may be relevant for such purpose. It should be noted that QPP interleavers have been applied for turbo codes and low density parity check (LDPC) codes. However, in that context, the interleaver is internal and part of the channel code for interleaving the bits, and does not serve the purpose of interleaving modulation symbols or DFT coefficients.

For any even N, all the quadratic polynomials $f_2k^2+f_1k$ (mod N) such that $f_2=N/2$ and $\gcd(f_1, N)=1$, where gcd(A, B) is the greatest common divisor of A and B, are QPPs that produce permutations which can be also obtained by LPPs given by $g_1k$ (mod N), where $g_1=N/2+f_1$. This can be proven by simply by transforming the values of the quadratic polynomial $\pi(k)=f_2k^2+f_1k$ (mod N) in to an LPP as:

$$\begin{aligned}\{\pi(0), \pi(1), \ldots, \pi(N-1)\} &= \\ &\{0, (f_1+N/2), 2f_1, (3f_1+N/2), 4f_1, \ldots, ((N-1)f_1+N/2)\}(\text{mod } N) \\ &= \{0, (f_1+N/2), 2(N/2+f_1), 3(N/2+f_1), \\ &\qquad 4(N/2+f_1), \ldots, (N-1)(N/2+f_1)\}(\text{mod } N) \\ &= \{0, g_1, 2g_1, 3g_1, 4g_1, \ldots, (N-1)g_1\}(\text{mod } N)\end{aligned} \tag{23}$$

In the sequel, only the irreducible QPPs, i.e., the QPPs that cannot be transformed into an LPP, will be considered. It is known that if and only if N is divisible by $p^2$ for some prime number p, there exists a QPP, albeit there is no guarantee that it is irreducible.

Figure 7:
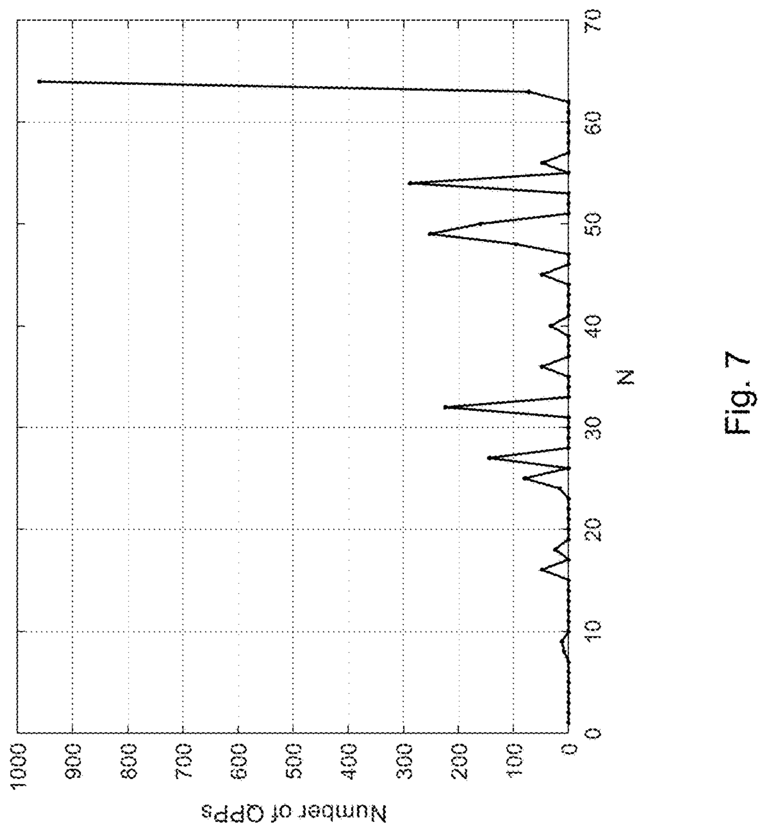
FIG. 7 shows the number of irreducible Quadratic permutation polynomials (QPPs) for different interleaver lengths N.

In FIG. 7, the number of QPPs is obtained by exhaustive search and is plotted for different values of N. It should be noted that in 3GPP long term evolution (LTE) and NR, resources are allocated in multiples of resource blocks (RBs). A resource block contains $12=2^2 3$ subcarriers, thus it will be possible to find a QPP for any resource allocation, since it is divisible by $2^2$. A sufficient (but not necessary) condition for the QPP to be irreducible is that N is divisible by 8. Since 24n is divisible by 8 for any n=1, 2, 3, . . . , at least any resource block allocation that contains an even number of RBs can have an associated irreducible QPP.

The number of irreducible QPPs depends on N and can be computed by given formulas. For some N, it will not be possible to find any irreducible QPPs. There are only reducible QPPs when:

N is a product of prime numbers greater than 2, each of them to the power 1;

N is a multiple of 4 of a product of prime numbers greater than 2, each of them to the power 1; and N is a multiple of 2 of a product of prime numbers greater than 2, each of them to the power 1.

Thus, we will exclude such N for the construction of QPPs.

Interleavers for Minimizing BER/BLER

According to Property 1 above, the basis functions can have different number of non-zero elements and they can be sparse. On a time-varying channel, it is anticipated in this disclosure that if the basis functions are not sparse, better time-diversity is achieved, in the sense that a modulation symbol is transmitted on multiple time samples. We therefore disclose to construct permutation polynomial interleavers that maximize the number of non-zero elements. Define the unit step function as $$u(x) = \begin{cases} 1, & x > 0 \\ 0, & x \le 0 \end{cases},$$

then a criterion of this disclosure is to construct the interleaver to maximize the number of non-zero elements over all time-samples and all basis functions. The number of non-zero elements for all time-samples and all basis functions, V, is computed according to:

$$V = \sum_{m=0}^{N-1}\sum_{n=0}^{N-1} u(|g[m, n]|) \tag{24}$$

It is clear that the value range is $N \le V \le N^2$. As an example, with N=128, the following values are obtained by exhaustive search of different QPPs. It should be noted that there are multiple polynomials for each value of V but only one is included in Table 1 for illustration.

TABLE 1

Example of QPPs and the number of non-zero values when N = 128.

| QPP | V |
|---|---|
| $f(k) = 2k^2 + k$ | 2732 |
| $f(k) = 4k^2 + k$ | 1368 |
| $f(k) = 8k^2 + k$ | 688 |
| $f(k) = 16k^2 + k$ | 352 |
| $f(k) = 32k^2 + k$ | 192 |
| $f(k) = 64k^2 + k$ | 128 |

It can be noted that there are QPPs for which V=N, i.e., one sample per basis function is utilized as for conventional DFT-s-OFDM. This is for the case when the signal becomes on the form (21), i.e., a permuted DFT-s-OFDM signal where a basis function is non-zero only on one sample. This is because some QPPs (i.e., reducible QPPs) could reduce to an LPP, e.g., $f(k)=64k^2+65k=k$ (mod 128), which generates the non-permuted DFT-s-OFDM signal. Through exhaustive search, it appears that the values of N for which there are QPPs with large V are when the factorization $$N = p_0^{k_0} \cdot p_1^{k_1} \cdot \ldots \cdot p_r^{k_r},$$

where $p_i$ is a prime number and $k_i$ is an integer, is having a high multiplicity of the term $p_i=2$, i.e., its $k_i$ large.

Figure 8:
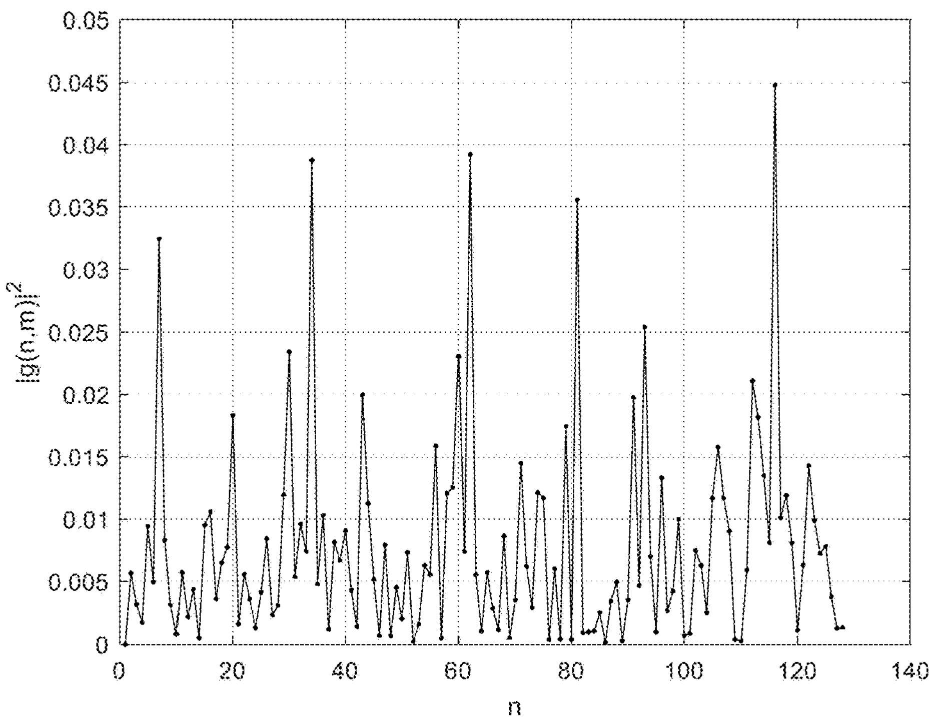
FIG. 8 shows example of the power of a basis function for different time samples using a pseudo-random interleaver.

Evaluations of pseudo-random interleavers (i.e., where the interleaver is generated from a randomly drawn integer sequence) have given that $V \approx N^2$ and the value of V does not show large variations. Condition (24) is therefore not suitable for selection among pseudo-random interleavers. It also means that the basis functions for pseudo-random interleaver are typically not sparse. However, as can be seen from FIG. 8, there may exist a QPP interleaver which gives comparable BER to a pseudo-random interleaver, at least for some N, despite that it has a value $V \ll N^2$. The difference between QPPs and a pseudo-random interleaver not only relates to V but also the distribution of power among the samples. Since the basis functions are not sparse for a pseudo-random interleaver, the power is much lower per sample than for basis functions of a QPP interleaver. Moreover, as shown in FIG. 6, the non-zero power is constant for a basis function, which is not the case for a basis functions obtained from a pseudo-random interleaver, as shown in FIG. 8. Thus, the gain of the larger value V of a pseudo-random interleaver may become limited by the random power distribution of the basis function.

TABLE 2

Simulation assumptions for link level evaluations.

| Parameter | Setting |
|---|---|
| Number of symbols | N = 128 |
| Channel | Vehicular A, 500 km/h |
| Subcarrier spacing | 15 kHz |
| Carrier frequency | 6 GHz |
| Receiver | MMSE |
| Channel code | For BER: no channel code<br>For BLER: 3GPP Polar code rate 3/4 |
| Channel estimation | Ideal |

We evaluate BER and BLER on a time-frequency selective channel with large Doppler shift, where the power delay profile follows the International Telecommunication Union (ITU) Vehicular A model and the UE velocity is set to 500 km/h, see Table 2. With a subcarrier spacing of 15 kHz and at a carrier frequency of 6 GHz, this corresponds to a maximum Doppler shift of 2.78 kHz, i.e., 19% of the subcarrier spacing. For block error rate (BLER) evaluation, the 3GPP polar code with code rate % is used.

Figure 9:
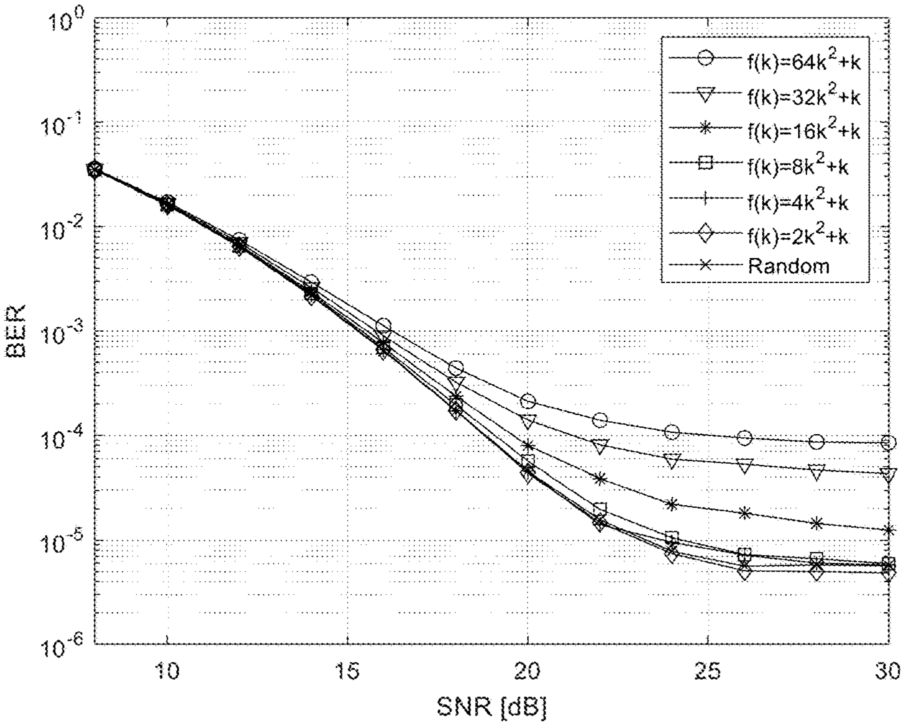
FIG. 9 shows bit error rate for Quadrature Phase Shift Keying (QPSK) as function of signal to noise ration (SNR) for different QPPs on a Vehicular A channel with 500 km/h velocity. The BER averaged over random interleavers is also included.

FIG. 9 shows uncoded bit error rate (BER) as function of signal-to-noise ratio (SNR) for quadrature phase shift keying (QPSK). It can be confirmed that QPPs with a large V offer lower BER and that properly chosen QPP can result in better performance than for conventional DFT-s-OFDM, which is same as for the BER of $f(k)=64k^2+k$. The BER of pseudo-random interleavers is also shown, i.e., a random interleaver (denoted “Random” in FIG. 9) is generated for each transmission attempt and the BER is an average over the interleavers. Thus, the result can be interpreted as the expected BER for any random interleaver. It can be concluded the best QPP gives a comparable BER to a pseudo-random interleaver.

Figure 10:
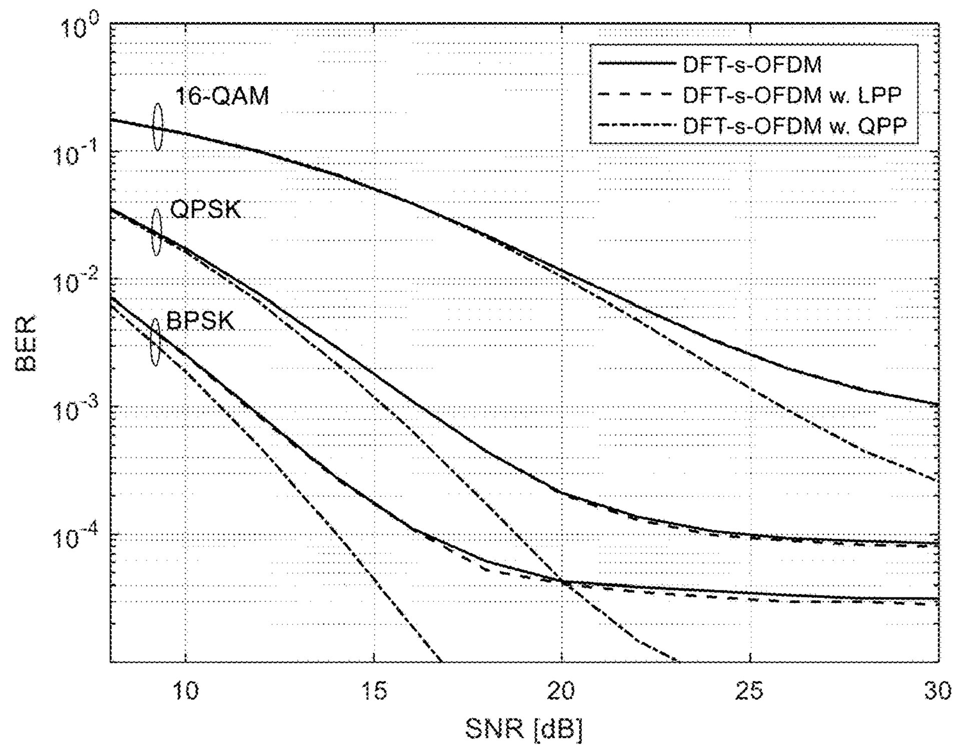
FIG. 10 shows bit error rate as function of SNR for DFT-s-OFDM without any interleaver, with a linear permutation polynomial (LPP) interleaver and with QPP interleaver, for different modulation formats.

An issue at higher velocities is the existence of an error floor, which arises due to that the orthogonality among the subcarriers is not maintained. FIG. 10 contains the uncoded BER for DFT-s-OFDM with the best QPP (i.e., $f(k)=2k^2+k$) which shows that the error floor can be suppressed significantly, by at least an order of a magnitude. FIG. 10 also contains the BER using an LPP that has been selected to minimize the PAPR. It can be seen that QPP shows much larger improvement in BER than LPP.

Figure 11:
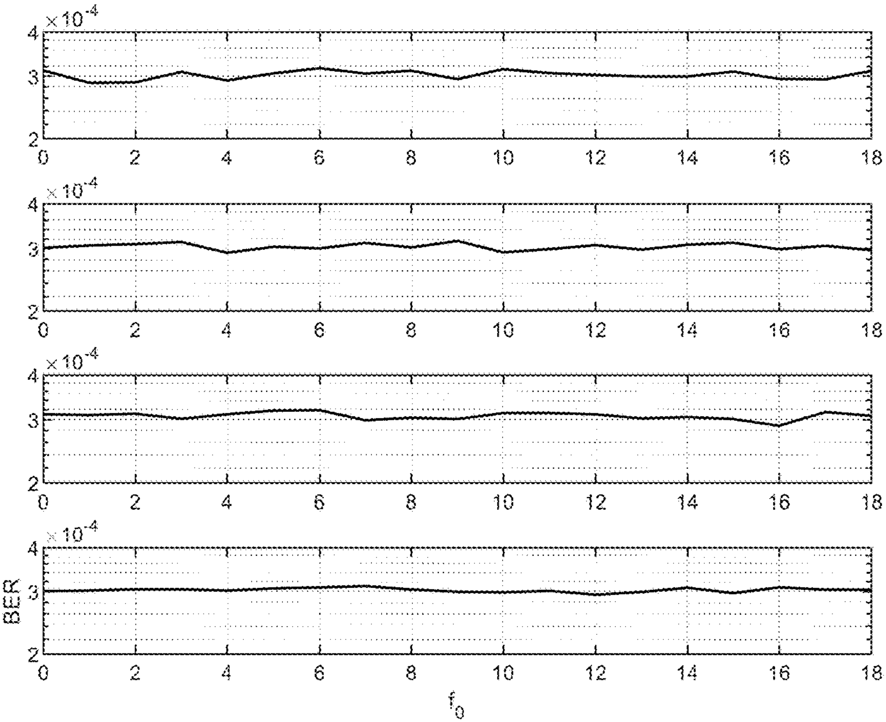
FIG. 11 shows BER for QPSK at SNR=19 dB for different LPP coefficients $f_0$ and $f_1=1$ (top), $f_1=3$ (second), $f_1=5$ (third) and $f_1=7$ (bottom)

FIG. 11 contains the BER at a fixed SNR and shows that the difference in BER among LPPs is small. Therefore, the criterion for selecting LPP should rather be on minimizing the PAPR.

Figure 12:
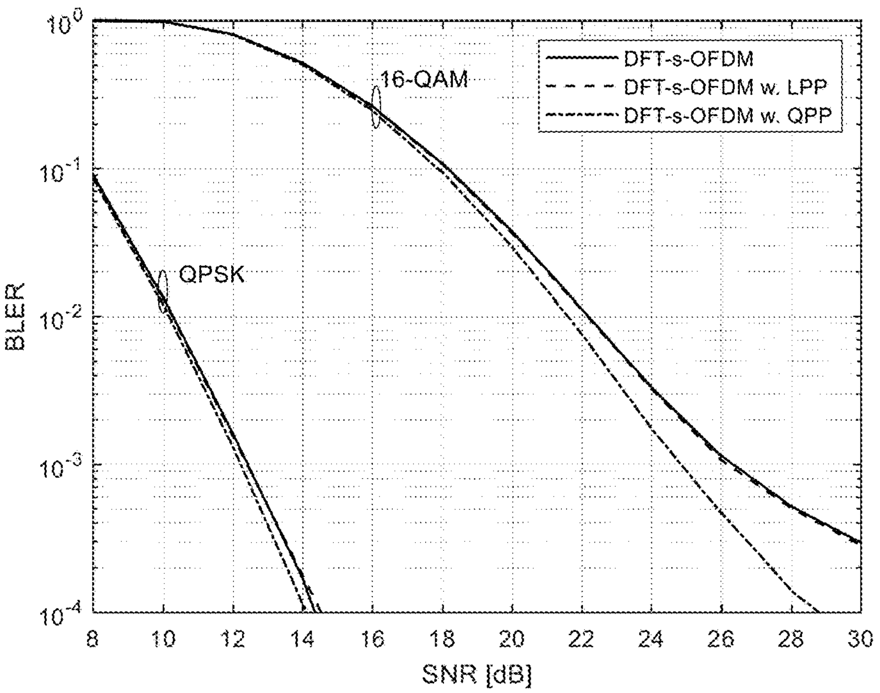
FIG. 12 shows block error rate as function of SNR for DFT-s-OFDM without any interleaver, with LPP interleaver and with QPP interleaver.

The desired BLER depends on the application and typically ranges from $10^{-1}$ for mobile broadband (MBB) data to $10^{-5}$ for ultra reliable low-latency communication (URLLC). A channel code will be able to capture time-frequency diversity by itself. Nevertheless, FIG. 12 contains the BLER with the same QPP and LPP as in FIG. 9, showing that there are gains from symbol interleaving even with state-of-the-art channel coding. The results of FIGS. 9 and 12 are in accordance with the gains in BER/BLER that the waveforms CCDT and ZAC-s-CDT exhibited over DFT-s-OFDM. However, as will be shown in the next section, those waveforms produce higher PAPR than the disclosed method with interleaving.

Figure 21:
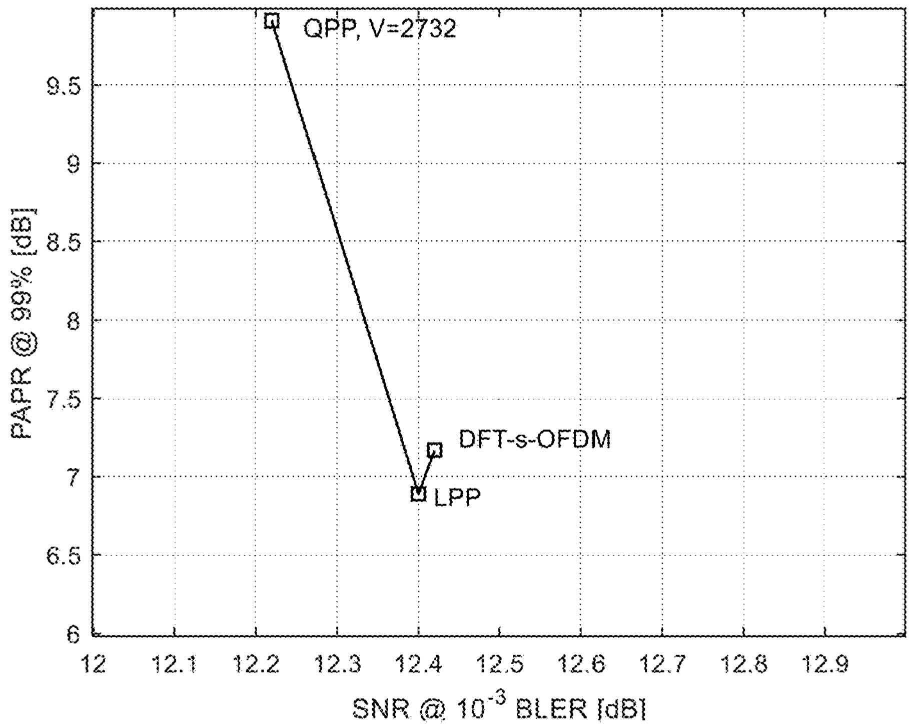
FIG. 21 shows trade-off between PAPR and BLER using QPSK (right diagram) and 16-QAM (left diagram)
Figure 21:
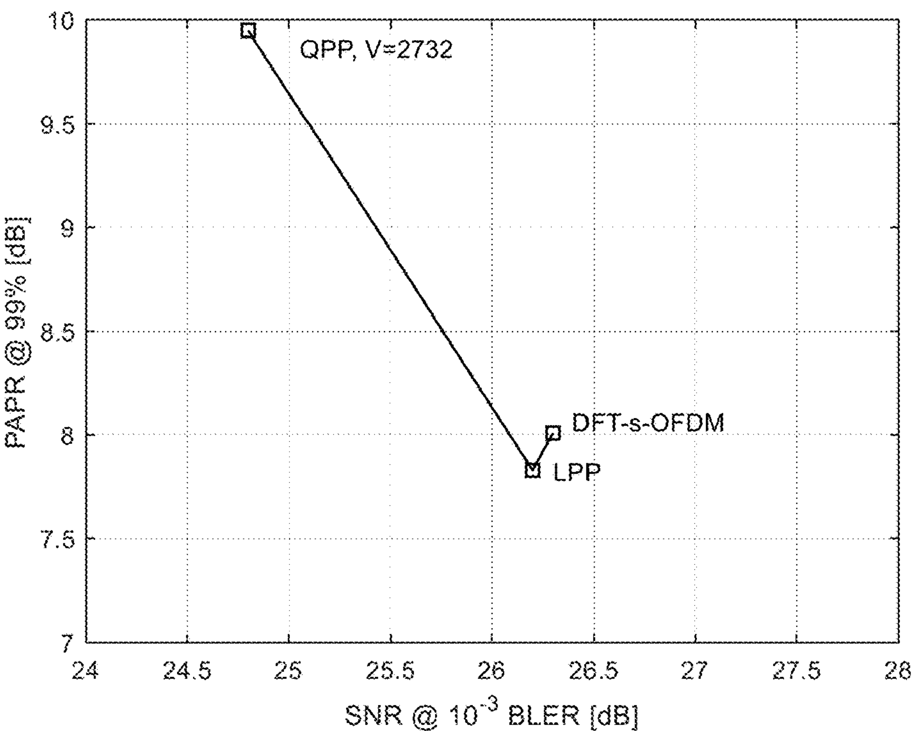

FIG. 21 shows the BLER with 16-QAM, for N=32 and N=64 for DFT-s-OFDM and DFT-s-OFDM with the QPP $f(k)=2k^2+k$. The respective values V are 172 and 684. It can be seen that there are gains from QPPs also for these interleaver lengths.

Figures 22, 23:
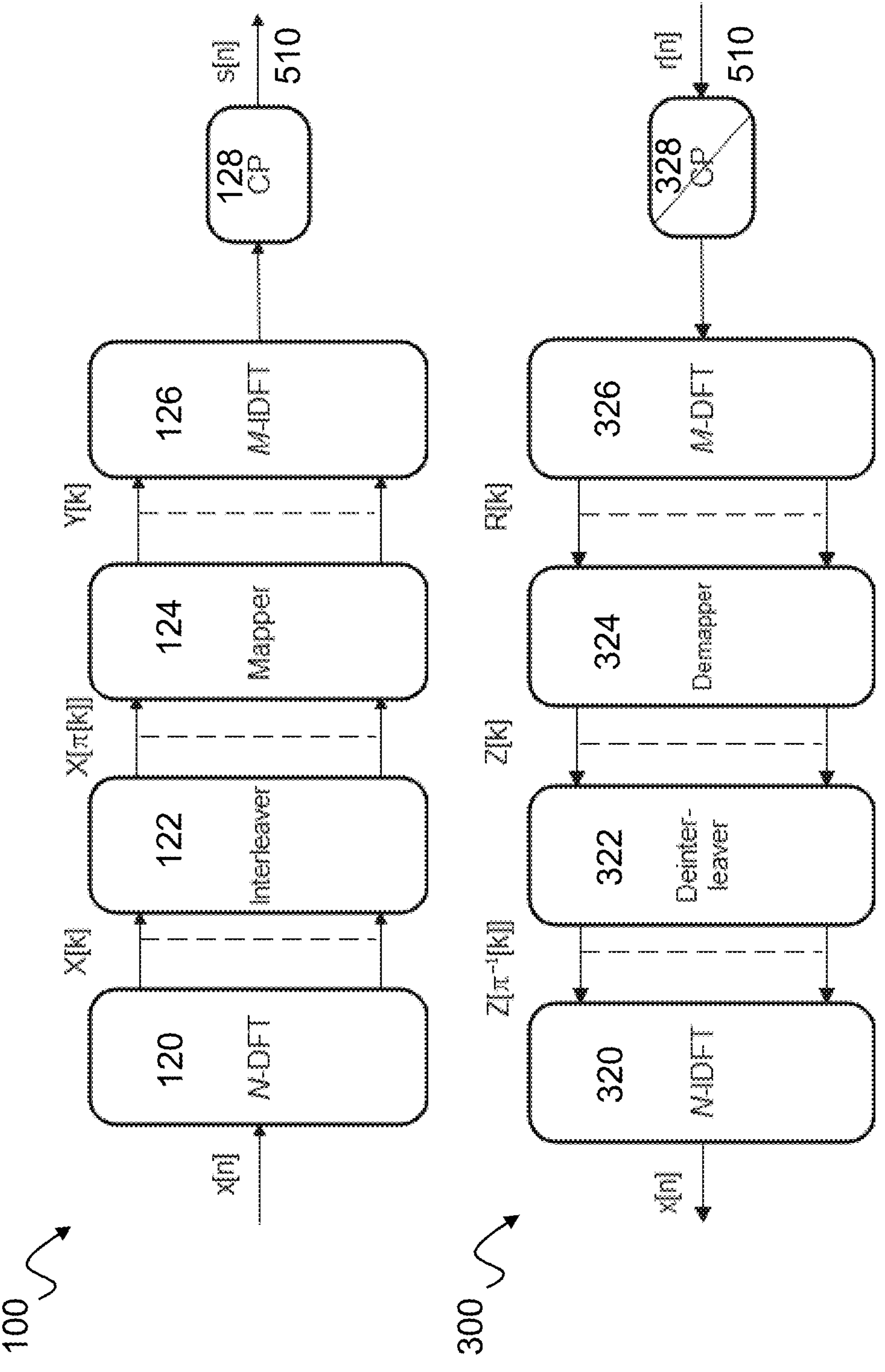
FIG. 22 shows a block diagram of an exemplified transmitter of a first communication device.
FIG. 23 shows a block diagram of an exemplified receiver of a second communication device.

FIG. 22 shows the BLER with 16-QAM, for $N=120=5\cdot 24=2^3\cdot 3\cdot 5$ with $f(k)=30k^2+k$ and for $N=144=6\cdot 24=2^4\cdot 3^2$ with $f(k)=6k^2+k$, which were the polynomials with maximum value V, i.e., 180 and 924. It can be seen that there are gains from QPPs also for these interleaver lengths.

Interleaver for Minimizing PAPR

In yet further embodiments of the present disclosure, it is described how to construct the interleaver to reduce the PAPR when BPSK, QPSK and 16-QAM is used. The PAPR should be evaluated on the continuous signal but as an approximation, the upsampled signal is considered. Therefore, consider an LPP and upsampling by a factor M/N, then the signal can be expressed for n=0, 1, . . . , M−1 with anew set of basis functions as $$\begin{aligned} s[n] &= \frac{1}{N}\sum_{m=0}^{N-1} x[m] \sum_{k=0}^{N-1} e^{-j\frac{2\pi}{N} m\pi(k)} e^{j\frac{2\pi}{M}nk} \\ &= \frac{1}{N}\sum_{m=0}^{N-1} x[m] \sum_{k=0}^{N-1} e^{-j\frac{2\pi}{N} m(f_1 k + f_0)} e^{j\frac{2\pi}{M}nk} \\ &= \frac{1}{N}\sum_{m=0}^{N-1} x[m] e^{-j\frac{2\pi}{N} m f_0} \sum_{k=0}^{N-1} e^{j2\pi k\left(\frac{n}{M} - \frac{m f_1}{N}\right)} \\ &= \frac{1}{N}\sum_{m=0}^{N-1} x[m] e^{-j\frac{2\pi}{N} m f_0} e^{j2\pi \frac{N}{M}\left(n - \frac{M}{N} f_1 m\right)\left(1-\frac{1}{N}\right)} \frac{\sin\left(\pi \frac{N}{M}\left(n - \frac{M}{N} f_1 m\right)\right)}{\sin\left(\pi \frac{1}{M}\left(n - \frac{M}{N} f_1 m\right)\right)} \\ &= \sum_{m=0}^{N-1} x[m] \underbrace{\frac{1}{N} h\left[n - \frac{M}{N} f_1 m\right] e^{-j\frac{2\pi}{N} m f_0}}_{g[m,n]} \end{aligned} \tag{25}$$

where:

$$h[i] = e^{j2\pi \frac{N}{M} i\left(1-\frac{1}{N}\right)} \frac{\sin\left(\pi \frac{N}{M} i\right)}{\sin\left(\pi \frac{1}{M} i\right)} \tag{26}$$

This can also be viewed upon that the set of N DFT-precoded of interleaved symbols x[m] are mapped to the N first contiguous subcarriers in a set of M subcarriers. Thus, (25) shows that the signal (13) can be expressed by anew set of basis functions, which are non-linear in the LPP coefficients. As opposed to (21), where it is obvious that the PAPR will not change depending on the interleaver, the LPP coefficients in the basis functions for (25) could affect the PAPR. The interleaver does not change the average transmitted power of the signal, thus minimization of the PAPR reduces to minimizing the peak power of $|s[n]|^2$.

Figure 13:
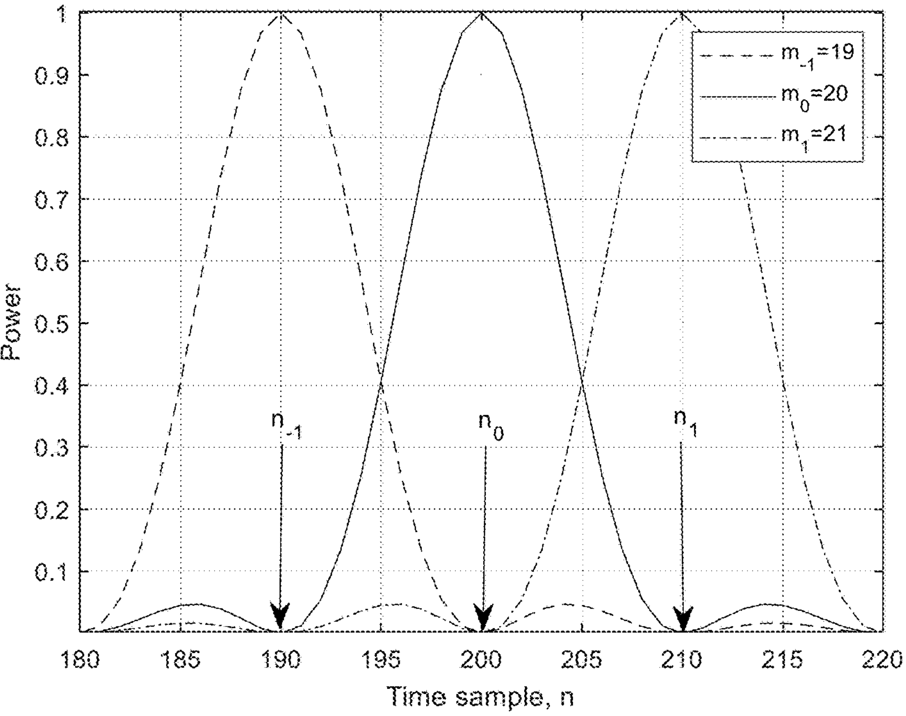
FIG. 13 shows example of the power of the basis function for different values of m with M/N=10, $f_1=1$ and $f_0=1$.

FIG. 13 shows the power of basis function $$|g[m,n]|^2 = \left|\frac{1}{N}h\left[n - \frac{M}{N}f_1 m\right]\right|^2$$

for a limited set of values n, and for m=19, 20, 21, where it is assumed that $f_1=1$ and M/N=10. It can be seen that symbol $m_0$ is modulated on basis function $g[m_0, n]$ which has its main power peak $|g[m_0,n_0]|^2$ at sample $$n_0 = \frac{M}{N}m_0.$$

Likewise, the basis function for symbol $m_1$ will have its power peak at sample $$n_1 = \frac{M}{N}m_1.$$

FIG. 13 illustrates that the signal power contribution on samples $n_0<n<n_1$, where $$n_1 = \frac{M}{N}m_1 = \frac{M}{N}m_0 + \frac{M}{N} \text{ and } m_1 = m_0 + 1,$$

$$\text{and } n_{-1} = \frac{M}{N}m_{-1} \text{ and } m_{-1} = m_0 - 1,$$

are from symbol $m_{-1}$, $m_0$ and $m_1$. However, the main power contribution is from $m_0$ and $m_1$, i.e., consecutive basis functions. The basis function in (24)-(25) contains a phase term and an amplitude term. From (25), it can be found that the phase term for modulation symbol m in $$g[m,n] = h\left[n - \frac{M}{N}f_1 m\right]e^{-j\frac{2\pi}{N}mf_0}$$

is $$\theta(m) = e^{-j2\pi\frac{NM}{MN}f_1 m\left(1-\frac{1}{N}\right)}e^{-j\frac{2\pi}{N}mf_0} = e^{-j\frac{2\pi}{N}m(f_0-f_1)} \tag{27}$$

where the phase term being dependent on n in (25), which is common to all m, has been removed. Thus, the phase difference between two consecutive modulation symbols $m_0$ and $m_1=m_0+1$ is $$\arg(\theta(m_0)\theta^*(m_0+1)) = \frac{2\pi}{N}(f_0 - f_1). \tag{28}$$

To reduce the peak power on samples $n_0<n<n_1$, it is disclosed herein that different phase values should be used for the modulation symbols on symbol $m_0$ and $m_1$, such that their basis functions do not add constructively. This reduces the signal power on samples $n_0<n<n_1$. Therefore, $f_0-f_1$ should be chosen to rotate the modulation symbol constellation such that for any symbols $x[m_0]$ and $x[m_1]$ taken from the modulation constellation, it holds that:

$$x[m_0]\theta(m_0) \neq x[m_1]\theta(m_1) \tag{29}$$

Figure 14:
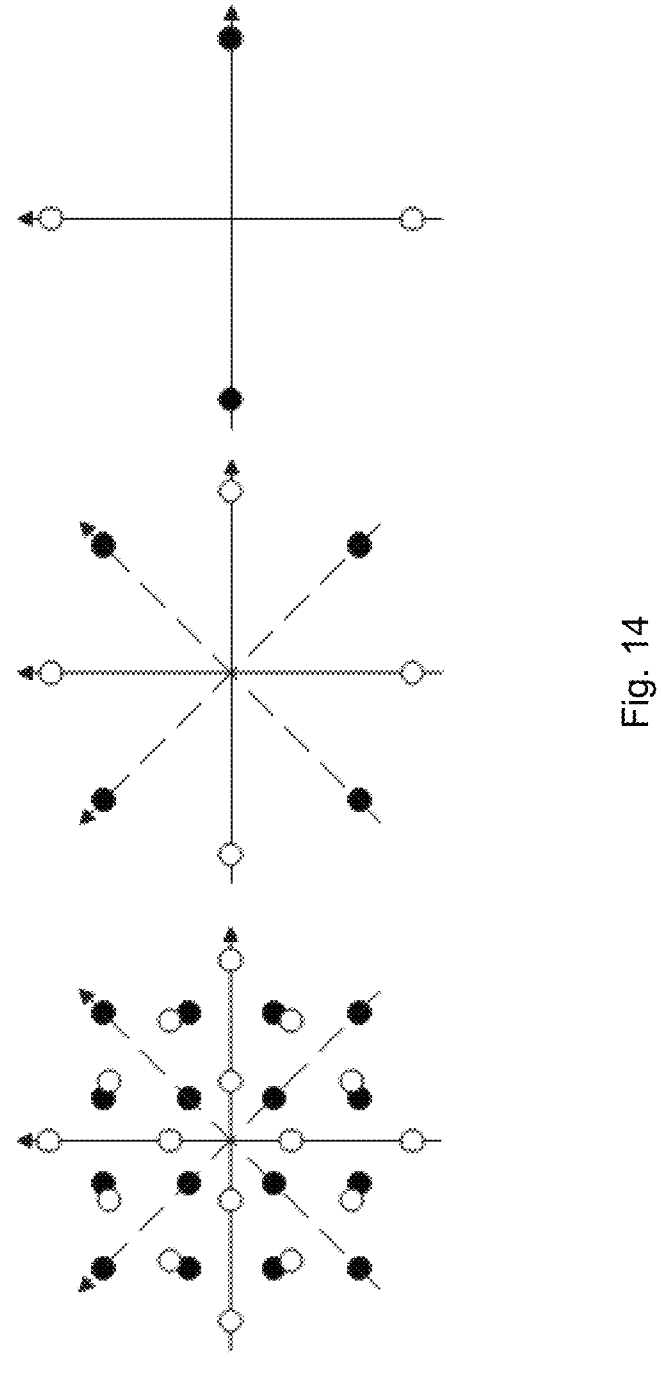
FIG. 14 shows example where 16-Quadrature Modulation (QAM), QPSK and binary phase-shift keying (BPSK) constellations are rotated.

Thus, the phase rotated constellation points for symbol $m_0$ should not be the same as the phase rotated constellation points for symbol $m_1$. For example, for a QPSK or 16-QAM constellation, this could be achieved by rotating the constellation an angle according to (27) as $$\frac{2\pi}{N}(f_0 - f_1) = t\frac{\pi}{4} \tag{30}$$

for t=1, 3, 5,7. Since the set of rotated constellation points become the same for all t, it is sufficient to consider t=1. This is illustrated in FIG. 14, where the rotation angle from (30) for 16-QAM and QPSK becomes π/4. Which shows that all the points in the rotated constellation are different from points in the original constellation. As seen in FIG. 14 for QPSK and BPSK, the constellation is rotated an angle that maximally separates the constellation points in the original constellation and rotated constellation.

Alternatively, the procedure could be described for any modulation format as: let $\varphi_0>0$ be the smallest rotation angle such that the rotated constellation points become the same as for the original non-rotated constellation. Select the LPP coefficients such that the rotation angle becomes $\varphi_0/2$.

For example, for 16-QAM and QPSK $\varphi_0=\pi/2$, and for BPSK $\varphi_0=\pi$.

Consider first the case $f_1=1$. Since $f_0$ and $f_1$ should be integers, it is disclosed using (29) that:

$$f_0 = \left\lfloor\frac{tN}{8}\right\rfloor + 1 \tag{31}$$

or $$f_0 = \left\lceil\frac{tN}{8}\right\rceil + 1 \tag{32}$$

Figure 15:
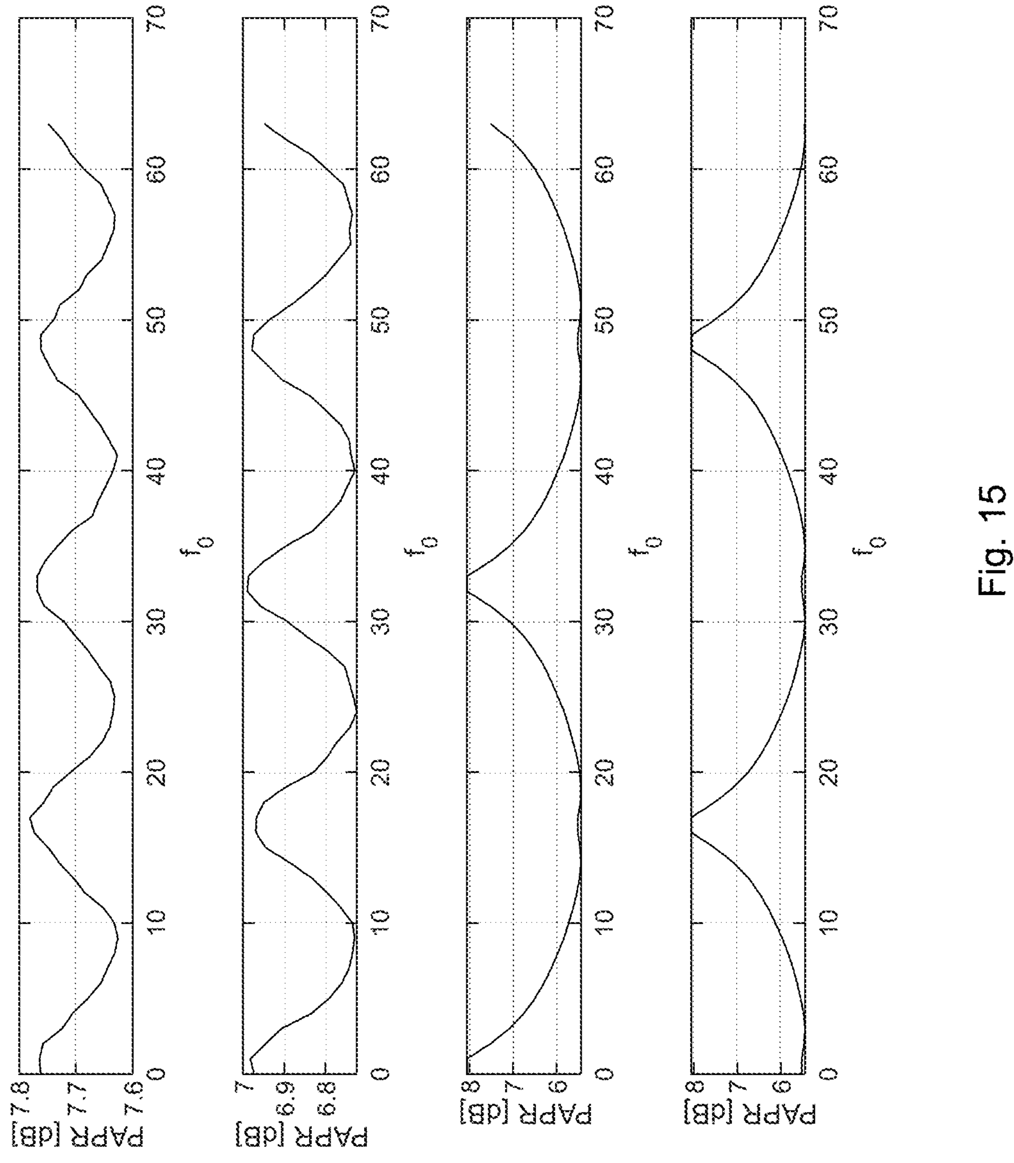
FIG. 15 shows PAPR at 1-percentile as function of $f_0$ for $f_1=1$, with 16-QAM (top), QPSK, BPSK and π/2-BPSK (bottom). Upsampling by a factor M/N=10 is used and N=64.

The results in FIG. 15, where the 1-percentile of the complementary cumulative distribution function (CCDF) of the PAPR is plotted as function of $f_0$, confirm that (31) and (32) give the best $f_0$. FIG. 15 shows PAPR at 1-percentile as function of $f_0$ for $f_1=1$, with 16-QAM (top), QPSK, BPSK and π/2-BPSK (bottom). Upsampling by a factor M/N=10 is used and N=64. The PAPR for BPSK is also shown and in that case, a good rotation angle would be $$\frac{2\pi}{N}(f_0 - f_1) = t\frac{\pi}{2} \tag{33}$$

for t=1, 3. That is, the rotation implies that:

$$f_0 = \left\lfloor \frac{tN}{4} \right\rfloor + 1 \tag{34}$$

or $$f_0 = \left\lceil \frac{tN}{4} \right\rceil + 1 \tag{35}$$

It can be verified from FIG. 15, and trials for other values of N, that this value of $f_0$, or values in its vicinity, minimize the PAPR. In this example, FIG. 15 shows that best ones are $$f_0 = \frac{tN}{4} + 1 \pm 2.$$

Hence, a general solution is $$f_0 = \left\lfloor \frac{tN}{4} \right\rfloor + 1 \pm p \text{ or } f_0 = \left\lceil \frac{tN}{4} \right\rceil + 1 \pm p$$

where p is an integer. Similarly for QPSK and 16-QAM, a general solution is $$f_0 = \left\lfloor \frac{tN}{8} \right\rfloor + 1 \pm p \text{ or } f_0 = \left\lceil \frac{tN}{8} \right\rceil + 1 \pm p$$

where p is an integer.

If the modulation symbols are randomly selected, e.g., which occurs for data transmission, the smaller the constellation size, the larger the probability that the modulation symbol are the same, $x[m_0]=x[m_1]$. That is, the basis functions of symbol $m_0$ and $m_1$ may more likely add in phase, if there were no interleaver. Therefore, a larger reduction in PAPR is expected for an LPP for small constellation sizes. As can be seen in FIG. 15, the reduction is significant, around 2.5 dB for BPSK. A comparison is also made to π/2-BPSK and it can be seen that its PAPR curve is a cyclically shifted version of the BPSK curve. Notably, the best PAPR for π/2-BPSK is not obtained with $f_0=0$ but with $$f_0 = \frac{tN}{4} + 1 \pm 2$$

mod N for t=0, 2. That is, an LPP interleaver may even slightly reduce the PAPR of π/2-BPSK. A drawback of π/2-BPSK is that it involves a memory in the modulation process, i.e., the constellation is rotated depending on the symbol index. These results show that the simpler BPSK with an LPP could provide same PAPR as π/2-BPSK.

For the case $f_1 \neq 1$, it follows from (26) that symbol $m_0$ has its main peak at sample $$n_0 = \frac{M}{N} f_1 m_0$$

(mod M) and $m_1$ has its main peak at sample $$n_0 = \frac{M}{N} f_1 m_1 (\text{mod } M).$$

Therefore, it may be that $m_1 \neq m_0+1$, i.e., the main power contribution on samples $$\frac{M}{N} f_1 m_0 < n < \frac{M}{N} f_1 + \frac{M}{N}$$

does not come from a modulation symbol being consecutive to $m_0$ if $$\frac{M}{N} f_1 m_1 (\text{mod } M) \neq \frac{M}{N} f_1 + \frac{M}{N}.$$

Therefore, the difference in phase can depend on the symbol index $m_0$, i.e., $$\arg(\theta(m_0)\,\theta^*(m_1)) = \frac{2\pi}{N}(m_1 - m_0)(f_0 - f_1) \tag{36}$$

Figure 16:
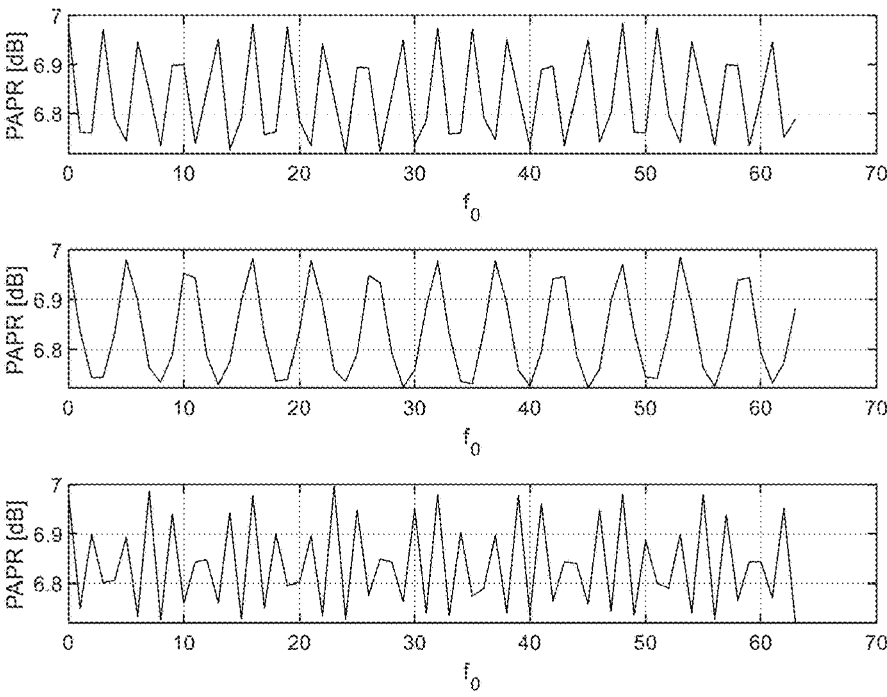
FIG. 16 shows PAPR at 1-percentile of the complementary cumulative distribution function (CCDF) as function of $f_0$ for $f_1=3$ (top), $f_1=5$ (middle) and $f_1=7$ (bottom), with QPSK. Upsampling by a factor M/N=10 is used and N=64.
Figure 17:
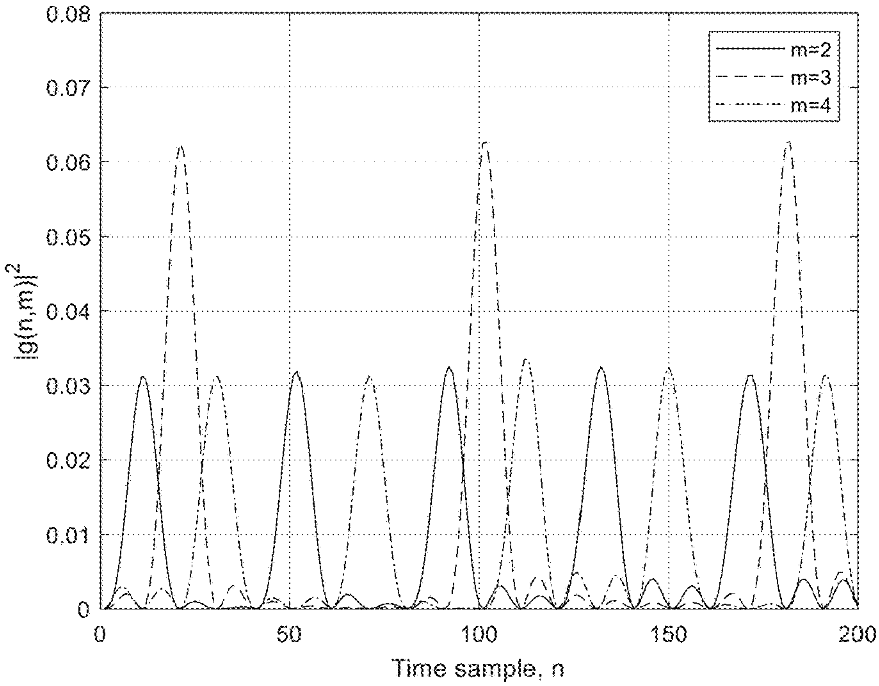
FIG. 17 shows example of magnitude of basis function using QPP $f(k)=2k^2+k$ for different values of m with M/N=10.

Which makes it difficult to select a proper value of $f_0$, where arg(z) is an operator defining the angle of the complex value z. However, as shown in FIG. 16, there is a periodicity in the PAPR and some values of $f_0$ are better than others. FIG. 16 shows PAPR at 1-percentile of the CCDF as function of $f_0$ for $f_1=3$ (top), $f_1=5$ (middle) and $f_1=7$ (bottom), with QPSK. Upsampling by a factor M/N=10 is used and N=64;

The basis functions with QPP interleaver can have multiple peaks as opposed to the single peak of LPP shown in FIG. 13 and may not have symmetric structure, cf. FIG. 17. Therefore, it is not straightforward to determine the best polynomial coefficients and QPPs are less applicable for the purpose of minimizing PAPR.

Table 3 contains the PAPR values measured at the 1-percentile on the CCDF for N=128 and M=10N, QPSK, for different LPPs. The reference case conventional DFT-s-OFDM corresponds to $f_1=1$ and $f_0=0$. Among these combinations, the best LPP is $f_1=5$ and $f_0=1$, which provides a gain of around 0.25 dB over DFT-s-OFDM (i.e., f(k)=k). The CCDF is plotted in FIG. 18.

TABLE 3

Example of 1-percentile PAPR values with N = 128, M = 10N and QPSK, resulting from different LPPs.

| | $f_0 = 0$ | $f_0 = 1$ | $f_0 = 2$ | $f_0 = 3$ | $f_0 = 4$ | $f_0 = 5$ | $f_0 = 6$ | $f_0 = 7$ |
|---|---|---|---|---|---|---|---|---|
| $f_1 = 1$ | 7.1685 | 7.1702 | 7.1611 | 7.1295 | 7.1091 | 7.0913 | 7.0432 | 7.0242 |
| $f_1 = 3$ | 7.1648 | 6.9373 | 6.9334 | 7.1732 | 6.9253 | 6.9529 | 7.1419 | 6.9084 |
| $f_1 = 5$ | 7.1844 | 6.9127 | 7.0320 | 7.0236 | 6.9155 | 7.1674 | 6.9150 | 7.0527 |
| $f_1 = 7$ | 7.1712 | 6.9510 | 6.9028 | 7.0805 | 7.0857 | 6.9104 | 6.9517 | 7.1772 |

Figure 18:
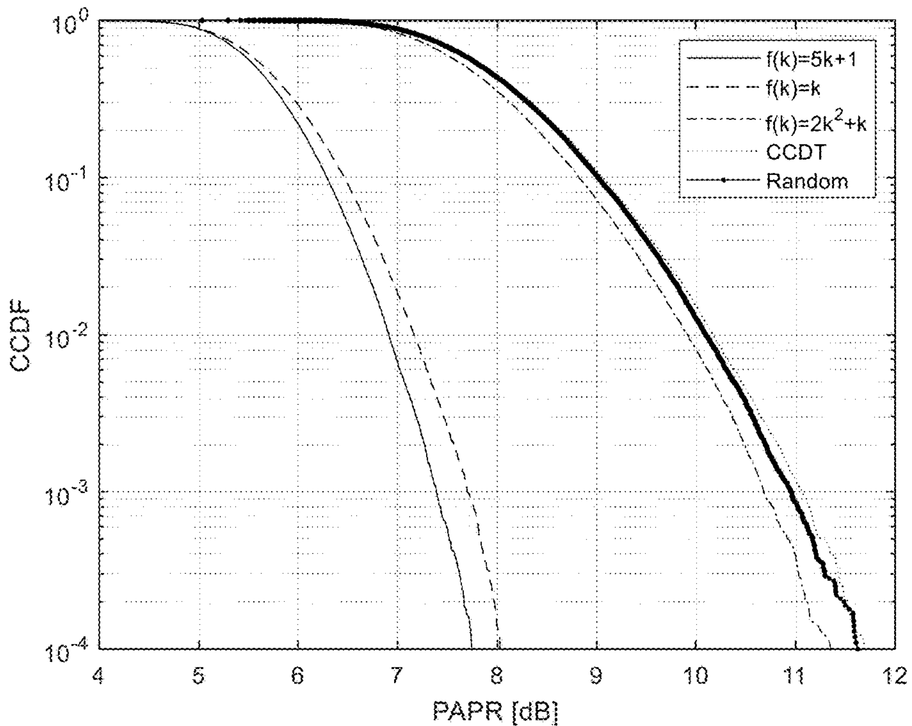
FIG. 18 shows CCDF of the PAPR using 10-times upsampling and QPSK modulation.

Furthermore, FIG. 18 shows the PAPR for the polynomial $f(k)=2k^2+k$, which offered the best BER in FIG. 9, and the PAPR of CCDT. It can be seen that CCDT requires slightly higher PAPR and is comparable to that of a pseudo-random interleaver and that the QPP results in much higher PAPR than the LPP.

Figure 19:
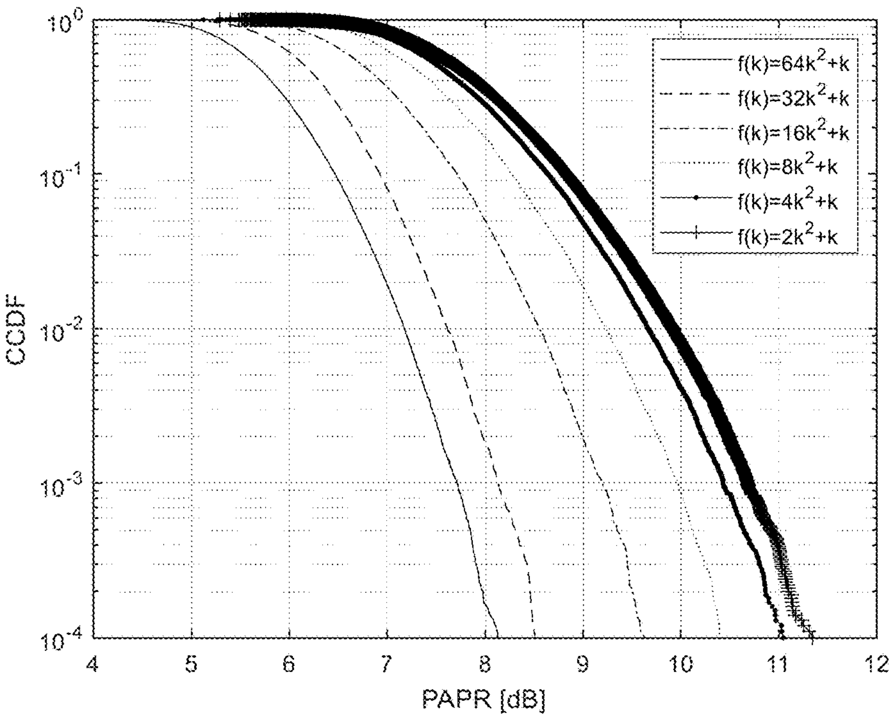
FIG. 19 shows CCDF of the PAPR using 10-times upsampling and QPSK modulation for different QPPs.

FIG. 19 shows the PAPR using the different QPPs from FIG. 9 and it can be concluded that there is a tradeoff between selecting a QPP for low PAPR or for low BER.

We set N=32 and perform an exhaustive search among all LPPs and QPPs, and select the one that minimizes the PAPR and evaluate the uncoded BER at a fixed SNR=10 dB. These results are contained in Table 4 and 5, which show that LPP reduces the PAPR but not the BER. It is noted that for BPSK, there exist QPPs which simultaneously both reduce the PAPR and the BER, compared to conventional DFT-s-OFDM.

TABLE 4

Results from exhaustive search of LPPs and QPPs for N = 32.

| | BPSK | | QPSK | | 16-QAM | |
|---|---|---|---|---|---|---|
| | PAPR [dB] | BER | PAPR [dB] | BER | PAPR [dB] | BER |
| DFT-s-OFDM | 7.62 | $2.3 \cdot 10^{-3}$ | 6.77 | $1.1 \cdot 10^{-2}$ | 7.54 | $11.8 \cdot 10^{-2}$ |
| LPP | 5.21 | $2.2 \cdot 10^{-3}$ | 6.49 | $1.1 \cdot 10^{-2}$ | 7.29 | $11.8 \cdot 10^{-2}$ |
| QPP | 6.11 | $1.3 \cdot 10^{-3}$ | 7.12 | $1.1 \cdot 10^{-2}$ | 7.56 | $12.0 \cdot 10^{-2}$ |

TABLE 5

Polynomials which minimize the PAPR.

| | BPSK | QPSK | 16-QAM |
|---|---|---|---|
| LPP | $f(k) = 25k + 31$ | $f(k) = 5k + 17$ | $f(k) = 17k + 28$ |
| QPP | $f(k) = 8k^2 + 7k + 4$ | $f(k) = 8k^2 + 23k + 15$ | $f(k) = 8k^2 + 21k + 19$ |

Furthermore, we perform exhaustive search of LPPs that minimize the PAPR for different N. Generally, the PAPR increases with N. The results are contained in Table 6, which show that the reduction in PAPR from an LPP exists for all N, that the gain of LPP increases with N and that the gain is largest for BPSK for all N.

TABLE 6

The 1-percentile CCDF PAPR [dB] from exhaustive search of LPPs.

| | | BPSK | QPSK | 16-QAM |
|---|---|---|---|---|
| N = 32 | DFT-s-OFDM | 7.62 | 6.77 | 7.54 |
| | LPP | 5.21 | 6.49 | 7.29 |
| N = 64 | DFT-s-OFDM | 8.08 | 6.97 | 7.80 |
| | LPP | 5.41 | 6.66 | 7.56 |

TABLE 6-continued

The 1-percentile CCDF PAPR [dB] from exhaustive search of LPPs.

| | | BPSK | QPSK | 16-QAM |
|---|---|---|---|---|
| N = 128 | DFT-s-OFDM | 8.36 | 7.15 | 8.02 |
| | LPP | 5.52 | 6.81 | 7.76 |

Trade-Off Between BER and PAPR

Figure 20:
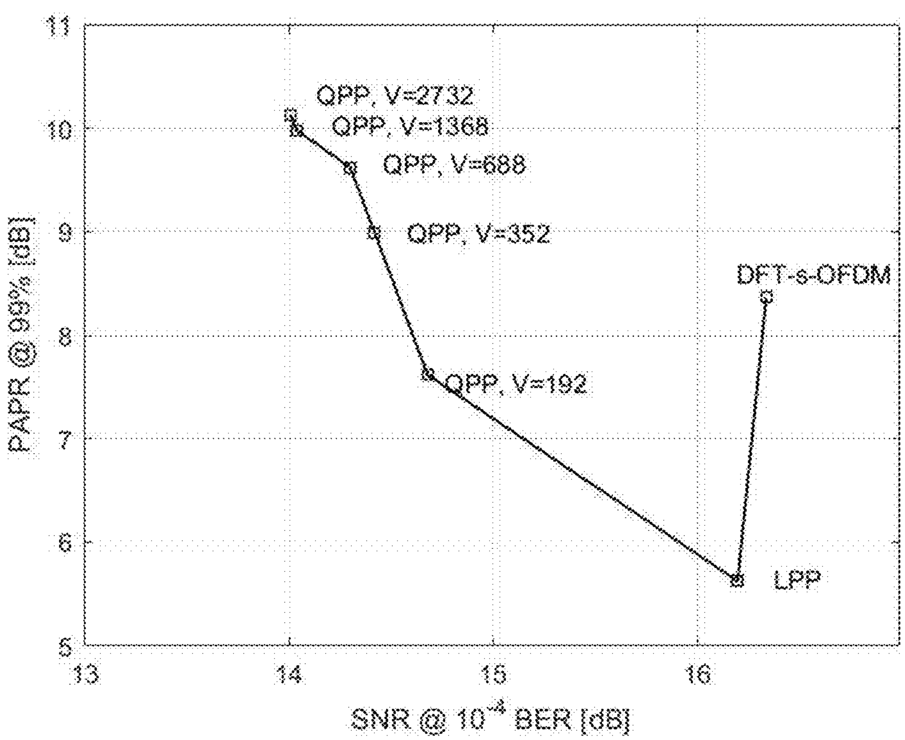
FIG. 20 shows trade-off between PAPR and BER using BPSK (right diagram) and QPSK (left diagram)
Figure 20:
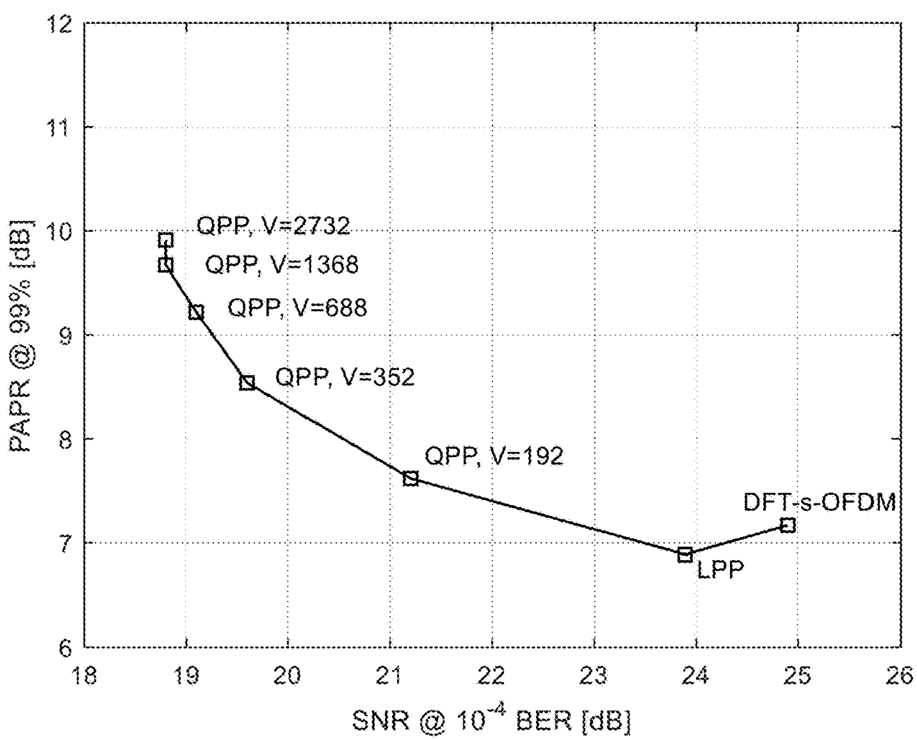

The selection of permutation polynomial is generally a trade-off between BER (or BLER) and PAPR, which may be evaluated by exhaustive search. FIG. 20 contains the PAPR at the 1-percentile CCDF as function of the required SNR to achieve $10^{-4}$ BER for N=128. The QPPs from FIG. 19 are used and the LPP is selected to minimize the PAPR according to the disclosed method. FIG. 20 shows trade-off between PAPR and BER using BPSK (right diagram) and QPSK (left diagram). This shows that QPP improves the BER more than the LPP and that LPP improves the PAPR more than the QPP. As noted previously, it is possible to find permutation polynomials which lead to simultaneously improved PAPR and BER compared to conventional DFT-s-OFDM. A similar trend is captured in FIG. 21 for the BLER where the required SNR is determined to achieve $10^{-3}$ BLER. FIG. 21 shows a trade-off between PAPR and BLER using QPSK (right diagram) and 16-QAM (left diagram).

Interleaver for Reference- or Synchronization Signals

The construction of large sets of reference- or synchronization signals with good correlation properties is a known problem. For this purpose, the disclosed method is further enhanced such that multiple signals are generated from one modulation sequence by using different interleavers. Thereby, large sets of signals could be generated.

In general terms such embodiments may involve the first communication device 100 being configured to transform a first set of modulation symbols and at least one second set of modulation symbols based on a DFT to obtain a first set of DFT precoded symbols and a second set of DFT precoded symbols. The first set of modulation symbols and the second set of modulation symbols are generated from the same predetermined modulation sequence. The first communication device 100 thereafter interleaves the first set of DFT precoded symbols based on a first permutation polynomial to obtain a first set of interleaved DFT precoded symbols, and interleaves the second set of DFT precoded symbols based on a second permutation polynomial to obtain a second set of interleaved DFT precoded symbols. Hence, the first permutation polynomial and the second permutation polynomial are different permutation polynomials resulting in different permutations since even different permutation polynomials could result in the same permutation.

The first communication device 100 modulates a set of subcarriers in a DFT-s-OFDM signal with the first set of interleaved DFT precoded symbols to obtain a first communication signal 510' comprising the first set of interleaved DFT precoded symbols. The first communication device 100 also modulates a set of subcarriers in a DFT-s-OFDM signal with the second set of interleaved DFT precoded symbols to obtain a second communication signal 510" comprising the second set of interleaved DFT precoded symbols.

FIG. 5 illustrates the case when the first communication device 100 generates two different communication signals 510', 510" and transmits the two different communication signals 510', 510" to two different second communication devices 300', 300". However, it is noted that the first communication device 100 may generate a plurality of communication signals according to the above described method. For example, assume that a synchronization signal is generated from an odd-length Zadoff-Chu sequence, $$x_u[k] = e^{-j\frac{\pi u}{N}k(k+1)},$$

where k=0, 1, . . . , N−1 and u=1, 2, . . . , N−1 is a root index which is relatively prime to N. It is known that the crosscorrelation function $p_{x_u x_v}[d]=1/\sqrt{N}$ when u≠v and $p_{x_u x_v}[d]=\delta[d]$ when u=v. Furthermore, as an example, assume LPPs enumerated by index i such that $\pi^{(i)}(k)=f^{(i)}(k) \pmod N$ with $$f^{(i)}(k) = f_1^{(i)}k + f_0^{(i)}.$$

Numerical evaluation gives that the crosscorrelation values of signals generated using the permutation polynomials can be identified as shown for the examples in Table 7.

TABLE 7

Periodic crosscorrelation functions of the signal when Zadoff-Chu sequence is used of length N = 127.

| Permutation polynomials | u ≠ v | u = v |
|---|---|---|
| $f^{(1)}(k) = 3k + 1$<br>$f^{(2)}(k) = 5k + 4$ | $\rho_{s_1 s_2}[d] = \begin{cases} 1/\sqrt{N}, & v \neq \acute{v} \\ \delta[d(u, \acute{v})], & v = \acute{v} \end{cases}$ | $\rho_{s_1 s_2}[d] = 1/\sqrt{N}$ |
| $f^{(1)}(k) = 3k + 1$<br>$f^{(2)}(k) = 3k + 1$ | $\rho_{s_1 s_2}[d] = 1/\sqrt{N}$ | $\rho_{s_1 s_2}[d] = \delta[d]$ |

The case of u≠v and different polynomials should be understood as that for every u, there exists one v=v́ with one associated delay d(u, v́), for which the crosscorrelation function is ideal. Thus, the crosscorrelation is 1 at d(u, v́) and 0 for other delays. For all other v≠v́ and delays, the crosscorrelation is $1/\sqrt{N}$. Therefore, by careful choice of interleaver and modulation sequence, sets of modulation sequences with low mutual crosscorrelation, e.g., $1/\sqrt{N}$, could be constructed.

Multiplexing of Signals

In (1), the N modulation symbols are mapped to N subcarriers. In a more general setting, the system may provide M>N subcarriers, which allows for frequency division multiplexing (FDM) of modulation symbols from different data streams, or users. A function q[k], k=0, 1, . . . , N−1, could be defined to allocate the symbols X[π(k)] to the M subcarriers according to some pre-defined pattern, e.g., in a block-wise manner or as a comb.

$$s[n] = \frac{1}{\sqrt{M}} \sum_{k=0}^{N-1} X[\pi(k)] e^{j\frac{2\pi}{M}nq[k]} \tag{37}$$

For orthogonal FDM, different functions q[k] are used for different users in order to assure that non-overlapping frequency resources are allocated. Examples of functions are; q[k]=k+d, which gives a contiguous allocation starting at subcarrier d; or q[k]=pk+d where p is an integer, which gives a comb-like allocation starting at subcarrier d. The present disclosure is not limited to these particular functions and therefore, in embodiments of the present disclosure, the set of subcarriers in the DFT-s-OFDM signal is:

a set of contiguous subcarriers; or a set of equally spaced discontiguous subcarriers; or a set of non-equally spaced discontiguous subcarriers.

A set of contiguous subcarriers typically leads to low PAPR. A set of equally or non-equally spaced discontiguous subcarriers typically leads to larger frequency diversity and lower BER/BLER.

Mapping of Modulation Symbols to Basis Functions

Based on Property 1, it follows that different basis functions will have different number of non-zero values. A modulation symbol carried by a basis function with large number of non-zero elements may be more reliable since the time diversity is larger. This can be utilized depending on the structure of the channel code. For example, modulation symbols which carry coded bits that are more error prone, or need higher error protection, could be allocated to the more reliable basis functions. For example, for polar code, bit errors are corrected by placing certain frozen bits whose values are known by the transmitter and the receiver to bit positions where decoding errors are prone to occur. Hence, frozen bits may be mapped according to the sparseness of the basis functions.

In other words, according to embodiments of the present disclosure, a set of bits are mapped to a subset of modulation symbols, wherein for each modulation symbol index m corresponding to a modulation symbol in the subset of modulation symbols, a value indicating the number of non-zeros of the basis function is determined as, $$\sum_{n=0}^{N-1} u(|g[m, n]|)$$

and is equal to or larger than a corresponding value for a modulation symbol index m not comprised in the subset of modulation symbols, where N is an integer denoting the number of interleaved DFT precoded symbols. Thereby, the bits which are assigned to the subset of modulation symbols will be transmitted on basis functions with equal or less number of zero-samples, i.e., they could become be more reliably detected bits.

Configuration of the Interleaver

The interleaver of the first communication device 100 may be pre-defined such that no signaling is needed from the receiver, e.g., a base station in a cellular communications system. For example, the interleaver could be pre-determined, or be dependent on the number of precoded modulation symbols.

Alternatively, a representation, e.g., its coefficients, or an index enumerating the interleaver, of the interleaver could be signaled to the first communication device 100. Such control signaling could be by higher layers in the communications protocol, e.g., radio resource control (RRC) signaling; or by the physical layer, e.g., included in a transmission grant sent from a base station to a UE. Likewise, if the transmission occurs from a base station to a receive device, the base station needs to provide a representation of the interleaver to the receive device, which could be done in the downlink control information (DCI) contained in the physical downlink control channel (PDCCH).

Therefore, in embodiments of the present disclosure, the first communication device 100 may be configured to transmit a control message 520 to the second communication device 300 as also shown in FIG. 5. The control message 520 indicates the permutation polynomial or its inverse permutation polynomial. Correspondingly, the second communication device 300 may be configured to receive the control message 520 from the first communication device 100. The control message 520 as aforementioned indicates the inverse permutation polynomial or its associated permutation polynomial for interleaving the set of DFT precoded symbols. Thereby, the second communication device will be able to deinterleave by deriving the information in the control message 520.

It may further be possible to configure a plurality of interleavers, e.g., some for the purpose of reducing the PAPR and some for the purpose of reducing the BER/BLER, and indicate to the transmitter/receiver which one should be used.

Receiver

The receiver of the second communication device 300 is performing the inverse operations compared to the transmitter of the first communication device 100, i.e., a DFT, deinterleaving and an IDFT. Interleavers based on permutation polynomials allow for simple deinterleaving. It is known that there exists at least one inverse permutation polynomial, $\pi^{-1}(k)$, to each permutation polynomial, such that $\pi^{-1}(\pi(k))=k$. The degree of $\pi^{-1}(k)$ may not be the same as for $\pi(k)$. Thus, deinterleaving is applied as $X[\pi^{-1}(k)]$. The inverse permutation polynomial, and in particular minimum degree inverse permutation polynomials, could be determined by known algorithms or exhaustive search.

Application of Inverse Permutation Polynomials in the Transmitter

The inverse of a permutation polynomial may have a degree which is smaller than or equal to a degree of its associated permutation polynomial for interleaving the set of DFT precoded symbols. The inverse permutation polynomial may in embodiments be an LPP or an irreducible QPP.

To reduce the implementation complexity in the receiver of the second communication device 300, it would be possible to use the inverse permutation polynomial for interleaver in the transmitter and the permutation polynomial for deinterleaver. For example, when N=32, by exhaustive search it can be found that the polynomial $f(k)=2k^2+k$ has 4 inverse polynomials of degree 3 and 32 inverse polynomials of degree 4. Table 8 compares the BER at SNR=10 dB and 1-percentile PAPR for the inverse QPP with the QPP. The QPP and its inverse polynomials all have the same value V=172.

TABLE 8

Results for N = 32 with QPP and inverse QPP.

| | BPSK | | QPSK | | 16-QAM | |
|---|---|---|---|---|---|---|
| QPP | PAPR [dB] | BER | PAPR [dB] | BER | PAPR [dB] | BER |
| $f(k) = 2k^2 + k$ | 8.51 | $1.3 \cdot 10^{-3}$ | 8.63 | $9.9 \cdot 10^{-3}$ | 8.80 | $12.1 \cdot 10^{-2}$ |
| $f(k) = 8k^3 + 6k^2 + 17k$ | 8.95 | $1.4 \cdot 10^{-3}$ | 8.63 | $9.8 \cdot 10^{-3}$ | 8.79 | $12.1 \cdot 10^{-2}$ |

In fact, the inverse QPPs always have the same value V as the associated QPP, which is shown below. Thus, it is not expected that there would be any significant differences in BER/BLER among these permutation polynomials. The relation between basis functions for a permutation polynomial $\pi(k)$ and its associated inverse permutation polynomial, $\pi^{-1}(k)$ is:

$$\begin{aligned} g_\pi[m, n] &= \frac{1}{N}\sum_{k=0}^{N-1} e^{-j\frac{2\pi}{N}m\pi(k)} e^{j\frac{2\pi}{N}nk} \\ &= \frac{1}{N}\sum_{p=0}^{N-1} e^{-j\frac{2\pi}{N}mp} e^{j\frac{2\pi}{N}n\pi^{-1}(p)} \\ &= g^*_{\pi^{-1}}[n, m] \end{aligned} \tag{38}$$

The second step follows from variable substitution $p=\pi(k)$. Therefore, using (38) it follows that $$\begin{aligned} \sum_{m=0}^{N-1}\sum_{n=0}^{N-1} u(|g_\pi[m, n]|) &= \sum_{m=0}^{N-1}\sum_{n=0}^{N-1} u(|g_{\pi^{-1}}[n, m]|) \\ &= \sum_{n=0}^{N-1}\sum_{m=0}^{N-1} u(|g_{\pi^{-1}}[m, n]|) \end{aligned} \tag{39}$$

which implies the same value V.

Block Diagrams

The baseband processing of an exemplary transmitter of the first communication device 100 is shown in FIG. 22. Channel encoding and modulation produces a set of modulation symbols x[n]. Alternatively, a predefined set of modulation symbols is used for a reference- or synchronization signal. The set of modulation symbols x[n] are transformed into a set of DFT precoded symbols in N-DFT block 120.

The set of DFT precoded symbols are interleaved based on a permutation polynomial in interleaver block 124. The mapper block 124 allocates the N DFT-precoded and permutation polynomial interleaved symbols to the M subcarriers by the function q[k]. The mapping could, e.g., be to a set of contiguous or non-contiguous set of subcarriers, as discussed previously. A cyclic prefix (CP) may be appended to the communication signal 510 in the CP block 128 before transmission in the communication system 500.

An exemplary block diagram of a receiver of the second communication device 300 is shown in FIG. 23. The second communication device 300 receives the communication signal 510 comprising a set of interleaved DFT precoded symbols modulated on a set of subcarriers. The CP is removed from the communication signal 510 in the CP removing block 338. The M-DFT block 326 performs an M-point DFT on the block of modulation symbols. The demapper block 324 extracts N symbols from the subcarriers. The deinterleaver block 322 uses an inverse permutation polynomial to produce a set of interleaved DFT precoded symbols which are input to a N-IDFT transformer block 320. The received set of modulation symbols x[n] are fed to a channel decoder, if they contain information data. A further step of channel equalization may be performed on R[k] or on x[n] using known equalization algorithms working in either the frequency- or time domain, in order to cancel the impact of a fading channel.

Alternative Implementation

An alternative representation of (12)-(13) is precoded DFT-s-OFDM. Define the following matrices:

DFT matrix: $W_N=[W_{kl}]$ with $$w_{kl} = \frac{1}{\sqrt{N}} e^{-j\frac{2\pi}{N}kl} \text{ for } k, l = 0, 1, \ldots, N-1$$

Mapping matrix: $Q=[q_{kl}]$ with $q_{kl}$ Σ{0,1}, and k=0, 1, . . . , M−1 and l=0, 1, . . . , N−1, which maps a length-N vector to the set of M subcarriers, cf. (37).

Permutation matrix: $P=[P_{kl}]$ with k=0, 1, . . . , N−1 and l=0, 1, . . . , N−1, which for each k, $p_{kl}=1$ if l=π(k) and $p_{kl}=0$ otherwise.

Precoding matrix:

$$G = W_N^{\dagger} P W_N$$

where † denotes Hermitian transpose operator.

The signal vector s=[s[n]]' where ' denotes transpose, is obtained from the symbol vector x=[x[n]]' and since $$W_N^{\dagger} W_N = W_N W_N^{\dagger} = I$$

where I is the identity matrix, an equivalent representation of FIG. 22 (excluding the CP) is given by:

$$\begin{aligned} s &= W_M^{\dagger} Q P W_N x \\ &= W_M^{\dagger} Q W_N G x \end{aligned} \tag{40}$$

Figures 24, 25:
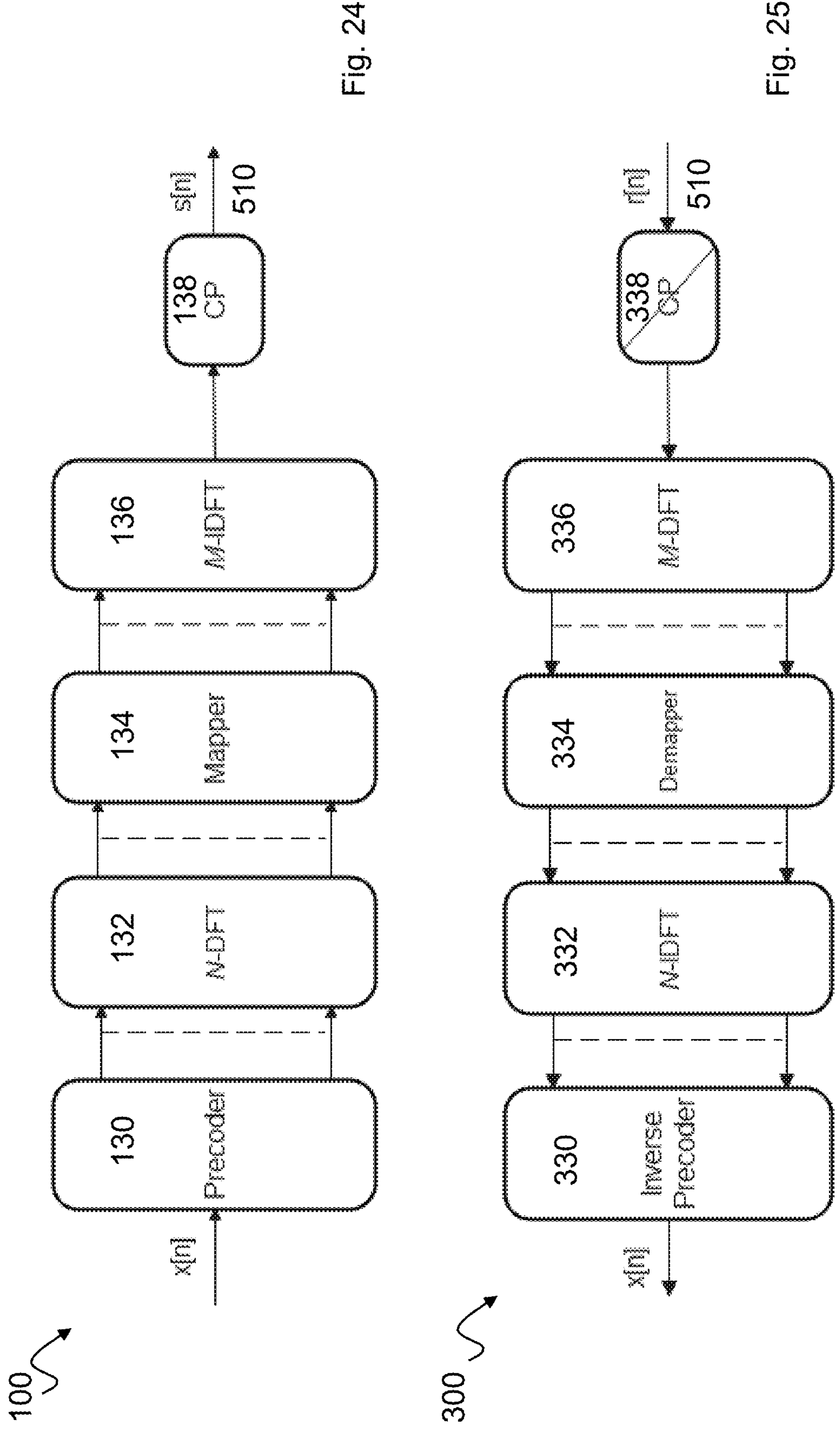
FIG. 24 shows a block diagram of an exemplified transmitter of a first communication device using precoding.
FIG. 25 shows a block diagram of an exemplified receiver of a second communication device using precoding.
Figure 26:
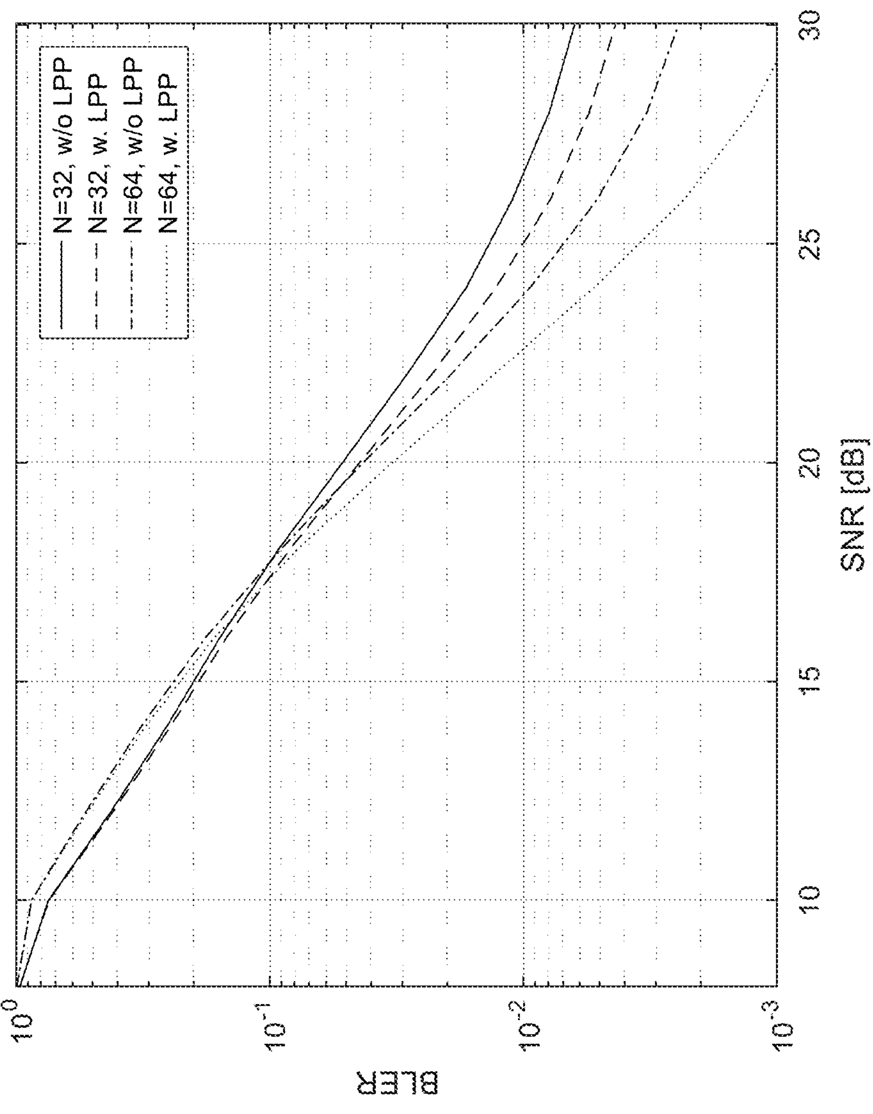
FIG. 26 shows BLER for 16-QAM for different interleaver lengths.
Figure 27:
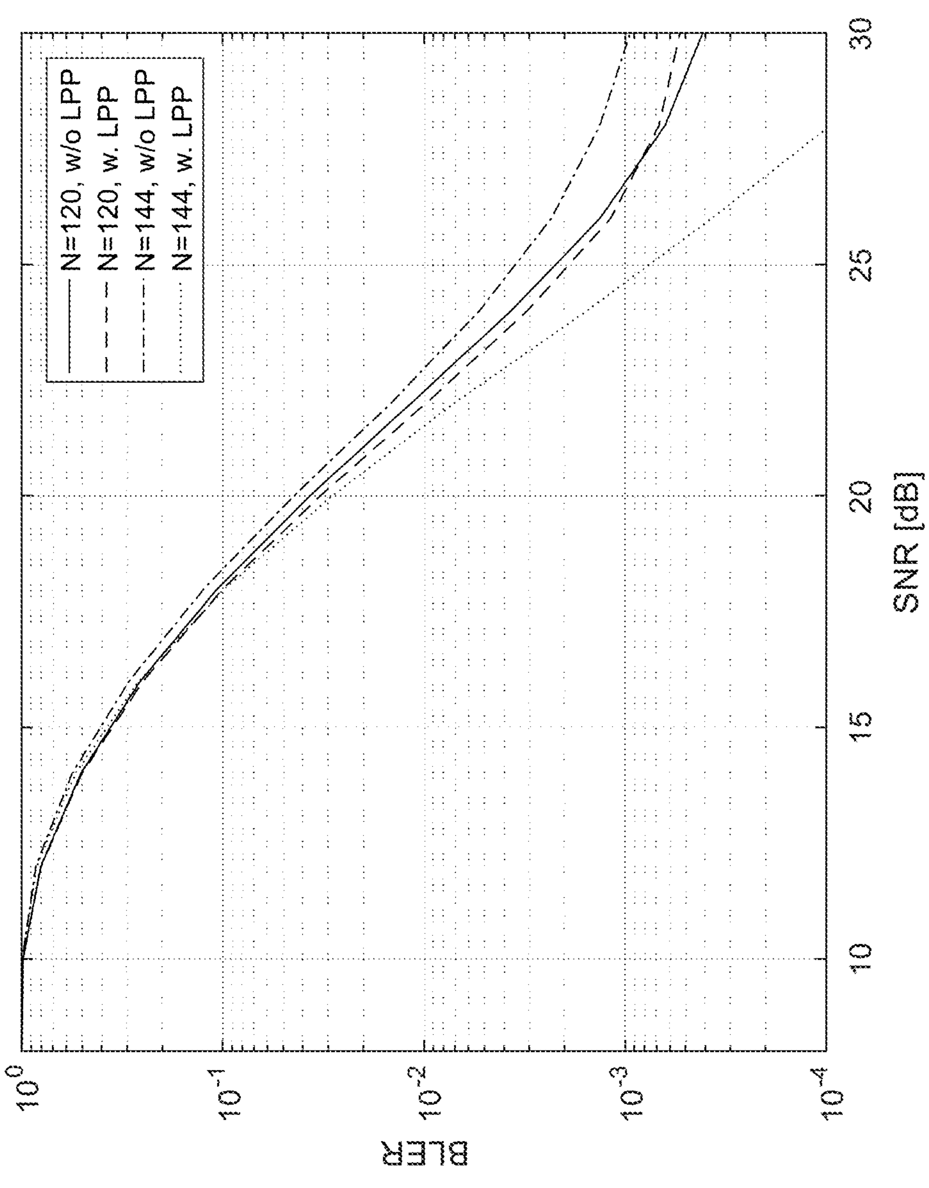
FIG. 27 shows BLER for 16-QAM for different interleaver lengths.

Hence, from (40) the method can alternatively be seen as DFT-s-OFDM with a precoder, which is illustrated in FIG. 24. The baseband processing of an exemplary transmitter of the first communication device 100 is shown in FIG. 24. Channel encoding and modulation produces a set of modulation symbols x[n]. Alternatively, a predefined sequence of modulation symbols is used for a reference- or synchronization signal. The set of modulation symbols are precoded (i.e., multiplied) by G in the precoder block 130. The precoded modulation symbols are then processed by the N-DFT-precoder block 132 and are mapped to a set of M subcarriers by the function q[k] in the mapper block 134. The mapping could, e.g., be to a set of contiguous or non-contiguous set of subcarriers, as discussed previously. The M-IDFT block 136 performs an M-point DFT on the block of modulation symbols. A cyclic prefix (CP) may also be appended to the communication signal 510 before transmission in the CP block 138.

Therefore, in an embodiment the first communication device 100 is configured to: precode a set of modulation symbols based on a permutation polynomial to obtain a set of precoded symbols; transform the set of precoded symbols by a DFT to obtain a set of DFT precoded symbols; modulate a set of subcarriers in a DFT-s-OFDM signal with the set of DFT precoded symbols to obtain a communication signal 510 comprising the set of DFT precoded symbols; and transmit the communication signal 510 to a second communication device 300.

A corresponding receiver could be as in FIG. 23. Alternatively, a receiver structure as shown in FIG. 25 could be used. From Property 2, it follows that the inverse precoder could be defined as $G^{-1}=G^{\dagger}$. An exemplary receiver of the second communication device 300 is shown in FIG. 25. The second communication device 300 receives the communication signal 510. The CP is removed from the communication signal 510 in the CP removing block 338. The M-DTF block 336 performs an M-point DFT on the block of modulation symbols. The demapper block 334 extracts the N symbols from the subcarriers, and the N symbols are inputted to the N-IDFT block 332. After this step, the block of symbols are multiplied with the Hermitian transpose of the matrix G in the inverse precoder block 330. The received modulation symbols x[n] are fed to a channel decoder, if they contain information data.

Therefore, in an embodiment the second communication device 300 is configured to: receive a communication signal 510 from a first communication device 100, the communication signal 510 comprising a set of interleaved DFT precoded symbols modulated on a set of subcarriers in a DFT-s-OFDM signal; extract the set of interleaved DFT precoded symbols based on the set of subcarriers in the DFT-s-OFDM signal; inverse transform the set of deinterleaved DFT precoded symbols based on an inverse DFT to obtain a set of modulation symbols; and deinterleave the set of interleaved DFT precoded symbols based on an inverse precoder to obtain a set of modulation symbols.

When P is derived from an LPP, the precoder G has certain structure. Namely, if $f_0=0$, then G is a permutation matrix. If $f_0 \neq 0$, then G is a phase modulated permutation matrix. This could be realized as follows. Suppose y[n] is the output from the precoder and that $$q = f_1^{-1}$$

is the inverse of $f_1$ modulo N. Then, with y=[y[n]]' and y=Gx, since FIG. 22

$$y[n] = \frac{1}{\sqrt{N}}\sum_{m=0}^{N-1} X[f_1 m + f_0]e^{-j\frac{2\pi}{N}mn} \quad (41)$$
$$= \frac{1}{\sqrt{N}}\sum_{m=0}^{N-1} X[f_1 m + f_0]e^{-j\frac{2\pi}{N}(f_1 m + f_0)qn}e^{j\frac{2\pi}{N}f_0 qn}$$
$$= \frac{e^{j\frac{2\pi}{N}f_0 qn}}{\sqrt{N}}\sum_{m=0}^{N-1} X[k]e^{-j\frac{2\pi}{N}kqn}$$
$$= e^{j\frac{2\pi}{N}f_0 qn}x[qn(\mathrm{mod}N)]$$

Hence, the nth row of G will contain $$e^{j\frac{2\pi}{N}f_0 qn}$$

in column qn (mod N), and zeros otherwise.

Generally, from the definition of $G=[g_{kp}]$ for k=0, 1, . . . , N−1 and p=0, 1, . . . , N−1, it can be deduced that, $$g_{kp} = \frac{1}{N}\sum_{n=0}^{N-1} e^{j\frac{2\pi}{N}nk}e^{-j\frac{2\pi}{N}\pi(n)p} \quad (42)$$
$$= g[p, k]$$

where the second step follows from (14). It is straightforward to verify that $g_{00}=1$, $g_{0p}=0$, $\forall p$ and $g_{k0}=0$, $\forall k$.

It is to be noted that the alternative implementations presented above can be combined with any of the variants of the disclosed permutation polynomial.

Involutory Permutation Matrix

A permutation matrix is involutory if $P^2=I$, i.e., its inverse is the permutation matrix itself. This means that the same permutation polynomial can be used for deinterleaving as for interleaving. Thus, a communication device could use the same interleaver for transmission and reception, which reduces complexity. It is known that P is involutory if it is derived from a permutation fulfilling $\pi(k)=\pi(1)k$ (mod N) and $\pi(1)^2\equiv 1$ (mod N). Thus, such a permutation could be generated from an LPP with $$f_1^2 \equiv 1(\mathrm{mod}\ N) \text{ and } f_0 = 0.$$

and $f_0=0$.

Furthermore, if P is involutory, it is known that it commutes with the DFT matrix, i.e., $W_N P = P W_N$. Therefore, it follows that G=P.

The number of solutions to $$f_1^2 \equiv 1(\mathrm{mod}\ N)$$

depends on N. However, the existence of an involutory permutation matrix (other than I) for any N is guaranteed by the following. Let $$P = W_N^2$$

and observe that it is a permutation matrix, since $$P = \begin{pmatrix} 1 & 0 & \dots & 0 \\ 0 & 0 & \dots & 1 \\ \vdots & \vdots & \dots & \vdots \\ 0 & 1 & \dots & 0 \end{pmatrix} \quad (43)$$

and $P^2=I$. The permutation of (41) is $$\{\pi(0), \pi(1), \dots, \pi(N-1)\} = \{0, N-1, N-2, \dots, 1\} \quad (44)$$

which can be generated by an LPP with $f_1=N-1$ and $f_0=0$.

The discussion above is for a communication system where the data symbols are precoded by a DFT, i.e., on vector form the operation can be defined as X=Wx, where W is a DFT matrix. In general, the method to permute X could be for any form of orthogonal precoder A fulfilling $AA^\dagger=I$, such that X=Ax.

A network access node herein may also be denoted as a radio network access node, an access network access node, an access point (AP), or a base station (BS), e.g., a radio base station (RBS), which in some networks may be referred to as transmitter, "gNB", "gNodeB", "eNB", "eNodeB", "NodeB" or "B node", depending on the standard, technology and terminology used. The radio network access nodes may be of different classes or types such as e.g., macro eNodeB, home eNodeB or pico base station, based on transmission power and thereby the cell size. The radio network access node may further be a station (STA), which is any device that contains an IEEE 802.11-conformant media access control (MAC) and physical layer (PHY) interface to the wireless medium (WM). The radio network access node may be configured for communication in 3GPP related long term evolution (LTE), LTE-advanced, fifth generation (5G) wireless systems, such as new radio (NR) and their evolutions, as well as in IEEE related Wi-Fi, worldwide interoperability for microwave access (WiMAX) and their evolutions.

A client device herein may be denoted as a user device, a user equipment (UE), a mobile station, an internet of things (IoT) device, a sensor device, a wireless terminal and/or a mobile terminal, and is enabled to communicate wirelessly in a wireless communication system, sometimes also referred to as a cellular radio system. The Ues may further be referred to as mobile telephones, cellular telephones, computer tablets or laptops with wireless capability. The Ues in this context may be, for example, portable, pocket-storable, hand-held, computer-comprised, or vehicle-mounted mobile devices, enabled to communicate voice and/or data, via a radio access network (RAN), with another communication entity, such as another receiver or a server. The UE may further be a station (STA), which is any device that contains an IEEE 802.11-conformant media access control (MAC) and physical layer (PHY) interface to the wireless medium (WM). The UE may be configured for communication in 3GPP related long term evolution (LTE), LTE-advanced, fifth generation (5G) wireless systems, such as new radio (NR), and their evolutions, as well as in IEEE related Wi-Fi, worldwide interoperability for microwave access (WiMAX) and their evolutions.

Furthermore, any method according to embodiments of the present disclosure may be implemented in a computer program, having code means, which when run by processing means causes the processing means to execute the steps of the method. The computer program is included in a computer readable medium of a computer program product. The computer readable medium may comprise essentially any memory, such as previously mentioned a read-only memory (ROM), a programmable read-only memory (PROM), an erasable PROM (EPROM), a flash memory, an electrically erasable PROM (EEPROM), or a hard disk drive.

Moreover, it should be realized that the first communication device 100 and the second communication device 300 comprise the necessary communication capabilities in the form of e.g., functions, means, units, elements, etc., for performing or implementing embodiments of the present disclosure. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing embodiments disclosed herein.

Therefore, the processor(s) of the first communication device 100 and the second communication device 300 may comprise, e.g., one or more instances of a central processing unit (CPU), a processing unit, a processing circuit, a processor, an application specific integrated circuit (ASIC), a microprocessor, or other processing logic that may interpret and execute instructions. The expression "processor" may thus represent a processing circuitry comprising a plurality of processing circuits, such as e.g., any, some or all of the ones mentioned above. The processing circuitry may further perform data processing functions for inputting, outputting, and processing of data comprising data buffering and device control functions, such as call processing control, user interface control, or the like.

Tt should be understood that the present disclosure is not limited to the embodiments described above, but also relates to and incorporates all embodiments described herein.

APPENDIX

Proof of Property 1: A sufficient condition for the sum $$g[m,n]=\frac{1}{N}\sum_{k=0}^{N-1}e^{-j\frac{2\pi}{N}m\pi(k)}e^{j\frac{2\pi}{N}nk}$$

to be zero is that nk−mπ(k) generates a set of values {q, q+1, . . . , q+N−1} for any integer q. The sum could also be zero for other sets of values, therefore the condition is sufficient but not necessary.

Proof of Property 2: Suppose two basis functions $g_m$=g[m, n] and $g_p$, =g[p, n] for m≠p, then:

$$\begin{aligned}\rho_{g_m g_p}[0]&=\sum_{n=0}^{N-1}g[m,n]g^*[p,n]\\&=\sum_{n=0}^{N-1}\frac{1}{N}\sum_{k=0}^{N-1}e^{-j\frac{2\pi}{N}m\pi(k)}e^{j\frac{2\pi}{N}nk}\frac{1}{N}\sum_{r=0}^{N-1}e^{j\frac{2\pi}{N}p\pi(r)}e^{-j\frac{2\pi}{N}nr}\\&=\frac{1}{N^2}\sum_{k=0}^{N-1}\sum_{r=0}^{N-1}e^{j\frac{2\pi}{N}(p\pi(r)-m\pi(k))}\sum_{n=0}^{N-1}e^{j\frac{2\pi}{N}n(k-r)}\end{aligned}$$

-continued $$\begin{aligned}&=\frac{1}{N}\sum_{r=0}^{N-1}e^{j\frac{2\pi}{N}(p-m)\pi(r)}\\&=\frac{1}{N}\sum_{r'=0}^{N-1}e^{j\frac{2\pi}{N}(p-m)r'}\\&=0\end{aligned}$$

where the substitution to r' follows from π(r) being a permutation polynomial.

Proof of Property 3: Suppose a basis function $g_m$=g[m, n], then:

$$\begin{aligned}\rho_{g_m g_m}[d]&=\sum_{n=0}^{N-1}g[m,n]g^*[m,n+d(\mathrm{mod}N)]\\&=\sum_{n=0}^{N-1}\frac{1}{N}\sum_{k=0}^{N-1}e^{-j\frac{2\pi}{N}m\pi(k)}e^{j\frac{2\pi}{N}nk}\frac{1}{N}\sum_{r=0}^{N-1}e^{j\frac{2\pi}{N}m\pi(r)}e^{-j\frac{2\pi}{N}(n+d)r}\\&=\frac{1}{N^2}\sum_{k=0}^{N-1}\sum_{r=0}^{N-1}e^{j\frac{2\pi}{N}(m\pi(r)-m\pi(k))}e^{-j\frac{2\pi}{N}dr}\sum_{n=0}^{N-1}e^{j\frac{2\pi}{N}n(k-r)}\\&=\frac{1}{N}\sum_{r=0}^{N-1}e^{-j\frac{2\pi}{N}dr}\\&=\delta[d(\mathrm{mod}N)]\end{aligned}$$

Proof of Property 4:

$$\begin{aligned}\rho_{g_m g_p}[d]&=\frac{1}{N^2}\sum_{k=0}^{N-1}\sum_{r=0}^{N-1}e^{j\frac{2\pi}{N}(p\pi(r)-m\pi(k))}e^{-j\frac{2\pi}{N}dr}\sum_{n=0}^{N-1}e^{j\frac{2\pi}{N}n(k-r)}\\&=\frac{1}{N}\sum_{r=0}^{N-1}e^{j\frac{2\pi}{N}(p-m)\pi(r)}e^{-j\frac{2\pi}{N}dr}\\&=g^*[p-m,d]\end{aligned}$$

Proof of Property 5: A sufficient, but not necessary, condition for the sum $$\rho_{g_m g_p}[d]=\frac{1}{N}\sum_{k=0}^{N-1}e^{j\frac{2\pi}{N}(p-m)\pi(k)}e^{-j\frac{2\pi}{N}dk}$$

to be zero is if (p−m)π(k)−dk generates a set of {q, q+1, . . . , q+N−1} for an integer q.

Proof of Property 6: For the first relation:

$$\begin{aligned}\left|\sum_{n=0}^{N-1}g[m,n]\right|&=\left|\sum_{n=0}^{N-1}\frac{1}{N}\sum_{k=0}^{N-1}e^{-j\frac{2\pi}{N}m\pi(k)}e^{j\frac{2\pi}{N}nk}\right|\\&=\left|\frac{1}{N}\sum_{k=0}^{N-1}e^{-j\frac{2\pi}{N}m\pi(k)}\sum_{n=0}^{N-1}e^{j\frac{2\pi}{N}nk}\right|\\&=\left|\sum_{k=0}^{N-1}e^{-j\frac{2\pi}{N}m\pi(k)}\delta[k]\right|\\&=\left|e^{-j\frac{2\pi}{N}m\pi(0)}\right|\\&=1\end{aligned}$$

-continued $$
\begin{aligned}
\left|\sum_{m=0}^{N-1} g[m,\ n]\right| &= \left|\sum_{m=0}^{N-1}\frac{1}{N}\sum_{k=0}^{N-1} e^{-j\frac{2\pi}{N}m\pi(k)} e^{j\frac{2\pi}{N}nk}\right| \\
&= \left|\frac{1}{N}\sum_{k=0}^{N-1} e^{j\frac{2\pi}{N}nk}\sum_{m=0}^{N-1} e^{-j\frac{2\pi}{N}m\pi(k)}\right| \\
&= \left|\sum_{k=0}^{N-1} e^{j\frac{2\pi}{N}nk}\delta[\pi[k]]\right| \\
&= \left|e^{j\frac{2\pi}{N}n\acute{k}}\right| \\
&= 1
\end{aligned}
$$

where $\pi[\acute{k}] = 0$.

For the second relation:

$$
\sum_{n=0}^{N-1} |g[m,\ n]|^2 = \rho_{g_m g_m}[0] = 1
$$

The second sum is:

$$
\begin{aligned}
\sum_{m=0}^{N-1} |g[m,\ n]|^2 &= \sum_{m=0}^{N-1}\frac{1}{N}\sum_{k=0}^{N-1} e^{-j\frac{2\pi}{N}m\pi(k)} e^{j\frac{2\pi}{N}nk}\frac{1}{N}\sum_{p=0}^{N-1} e^{j\frac{2\pi}{N}m\pi(p)} e^{-j\frac{2\pi}{N}np} \\
&= \frac{1}{N^2}\sum_{k=0}^{N-1}\sum_{p=0}^{N-1} e^{j\frac{2\pi}{N}n(k-p)}\sum_{m=0}^{N-1} e^{j\frac{2\pi}{N}m(\pi(p)-\pi(k))} \\
&= \frac{1}{N}\sum_{k=0}^{N-1} 1 \\
&= 1
\end{aligned}
$$

since the last sum is equal to N when $\pi(p)=\pi(k)$, which implies that $k=p$.

Proof of Property 7: Using the result of Property 4, $$
\begin{aligned}
\rho_{s_1 s_2}[d] &= \sum_{n=0}^{N-1}\sum_{m=0}^{N-1}\sum_{p=0}^{N-1} x_1[m]g[m,\ n]x_2^*[p]g^*[p,\ n+d] \\
&= \sum_{m=0}^{N-1}\sum_{p=0}^{N-1} x_1[m]x_2^*[p]\sum_{n=0}^{N-1} g[m,\ n]g^*[p,\ n+d] \\
&= \sum_{m=0}^{N-1}\sum_{p=0}^{N-1} x_1[m]x_2^*[p]\rho_{g_m g_p}[d] \\
&= \sum_{m=0}^{N-1}\sum_{p=0}^{N-1} x_1[m]x_2^*[p]g^*[p-m,\ d] \\
&= \sum_{m=0}^{N-1}\sum_{t=0}^{N-1} x_1[m]x_2^*[m+t]g^*[t,\ d] \\
&= \sum_{t=0}^{N-1} \rho_{x_1 x_2}[t]g^*[t,\ d]
\end{aligned}
$$

Proof of Property 8: From Property 7, we get $$
\rho_{s_1 s_2}[0] = \sum_{t=0}^{N-1} \rho_{x_1 x_2}[t]g^*[t,\ 0]
$$

-continued $$
\begin{aligned}
&= \sum_{t=0}^{N-1} \rho_{x_1 x_2}[t]\frac{1}{N}\sum_{k=0}^{N-1} e^{j\frac{2\pi}{N}t\pi(k)} \\
&= \sum_{t=0}^{N-1} \rho_{x_1 x_2}[t]\delta[t] \\
&= \rho_{x_1 x_2}[0]
\end{aligned}
$$

Proof of Property 9: Since $\rho_{xx}[t]=\delta[t]$, it follows from Property 7 that:

$$
\begin{aligned}
\rho_{ss}[d] &= \sum_{t=0}^{N-1} \rho_{xx}[t]g^*[t,\ d] \\
&= \sum_{t=0}^{N-1} \delta[t]g^*[t,\ d] \\
&= g^*[0,\ d] \\
&= \frac{1}{N}\sum_{k=0}^{N-1} e^{j\frac{2\pi}{N}dk} \\
&= \delta[d]
\end{aligned}
$$

Proof of Property 10:

$$
\begin{aligned}
s[n] &= \frac{1}{N}\sum_{m=0}^{N-1} x[m]\sum_{k=0}^{N-1} e^{-j\frac{2\pi}{N}m\pi(k)} e^{j\frac{2\pi}{N}nk} \\
&= \frac{1}{N}\sum_{m=0}^{N-1} x[m]\sum_{k=0}^{N-1} e^{-j\frac{2\pi}{N}m(f_1 k+f_0)} e^{j\frac{2\pi}{N}nk} \\
&= \frac{1}{N}\sum_{m=0}^{N-1} x[m]e^{-j\frac{2\pi}{N}f_0 m}\sum_{k=0}^{N-1} e^{j\frac{2\pi}{N}k(n-mf_1)} \\
&= x\left[nf_1^{-1}(\mathrm{mod}\ N)\right]e^{-j\frac{2\pi}{N}nf_1^{-1}f_0}
\end{aligned}
$$

where the last sum exists only when the linear congruence equation has a solution $mf_1 \equiv n \pmod N$. A solution exists if $n \equiv 0 \pmod d$, where $d=\gcd(f_1, N)$. Since $\pi(k)$ is a permutation polynomial, $\gcd(f_1, N)=1$, therefore there exists a unique $m=nf_1^{-1}$.

Proof of Property 11:

$$
\begin{aligned}
|\rho_{ss}[d]| &= \left|\sum_{n=0}^{N-1} x\left[nf_1^{-1}(\mathrm{mod}\ \ N)\right]e^{-j\frac{2\pi}{N}nf_1^{-1}f_0}x^*\left[(n+d)f_1^{-1}(\mathrm{mod}\ \ N)\right]e^{j\frac{2\pi}{N}(n+d)f_1^{-1}f_0}\right| \\
&= \left|\sum_{n=0}^{N-1} x\left[nf_1^{-1}(\mathrm{mod}\ N)\right]x^*\left[(n+d)f_1^{-1}(\mathrm{mod}\ \ N)\right]\right|
\end{aligned}
$$

Proof of Property 12: The signal has CA from Property 10 and has ZAC from Property 9.

What is claimed is:

1. A first communication device for a communication system, the first communication device comprising a non-transitory computer-readable storage medium storing a computer program that causes the first communication device to be configured to:

transform a set of modulation symbols based on a discrete Fourier transform (DFT) to obtain a set of DFT pre-coded symbols;

interleave the set of DFT precoded symbols based on a permutation polynomial to obtain a set of interleaved DFT precoded symbols;

modulate a set of subcarriers in a DFT spread orthogonal frequency division multiplexing (DFT-s-OFDM) signal with the set of interleaved DFT precoded symbols to obtain a communication signal comprising the set of interleaved DFT precoded symbols; and transmit the communication signal to a second communication device wherein the permutation polynomial is permutation polynomial π(k), the permutation polynomial π(k) being expressed as $$\pi(k) = f(k)(\text{mod } N) \text{ with } f(k) = f_p k^p + f_{p-1}k^{p-1} + \cdots + f_0$$

where (mod N) is the modulo-N operator, k, p, $f_p$ and N are integers, where N denotes the number of interleaved DFT precoded symbols, and where the permutation polynomial π(k) is a p:th degree permutation polynomial permuting the values in the set {0, 1, . . . , N−1}.

2. The first communication device according to claim 1, further configured to interleave the set of DFT precoded symbols based on the permutation polynomial π(k) by applying the permutation polynomial π(k) to a set of N DFT precoded symbols X[k], k=0, 1, . . . , N−1, as X[π(k)], where k and N are the integers, where N denotes the number of interleaved DFT precoded symbols.

3. The first communication device according to claim 2, wherein the permutation polynomial π(k) is a linear permutation polynomial.

4. The first communication device according to claim 3, wherein the coefficients of the permutation polynomial π(k) are $f_1$=1 and $$f_0 = \left\lfloor \frac{tN}{8} \right\rfloor + 1 \text{ or } f_0 = \left\lceil \frac{tN}{8} \right\rceil + 1 \text{ for } t = 1, 3, 5, 7;$$

$$f_0 = \left\lfloor \frac{tN}{8} \right\rfloor + 1 \pm p \text{ or } f_0 = \left\lceil \frac{tN}{8} \right\rceil + 1 \pm p \text{ for } t = 1, 3, 5, 7 \text{ and an integer } p;$$

$$f_0 = \left\lfloor \frac{tN}{4} \right\rfloor + 1 \text{ or } f_0 = \left\lceil \frac{tN}{4} \right\rceil + 1 \text{ for } t = 1, 3;$$

$$f_0 = \left\lfloor \frac{tN}{4} \right\rfloor + 1 \pm p \text{ or } f_0 = \left\lceil \frac{tN}{4} \right\rceil + 1 \pm p \text{ for } t = 1, 3 \text{ and an integer } p;$$

where $\lfloor . \rfloor$ is the floor operator, $\lceil . \rceil$ is the ceiling operator, and N is an integer denoting the number of interleaved DFT precoded symbols.

5. The first communication device according to claim 3, wherein the coefficients of the permutation polynomial $$\pi(k) \text{ are } f_1^2 \equiv 1 \text{ and } f_0 = 0.$$

6. The first communication device according to claim 2, wherein the permutation polynomial π(k) is an irreducible quadratic permutation polynomial.

7. The first communication device according to claim 6, wherein the irreducible quadratic permutation polynomial fulfils:

$$\sum_{m=0}^{N-1}\sum_{n=0}^{N-1} u(|g[m, n]|) > N$$

$$g[m, n] = \frac{1}{N}\sum_{k=0}^{N-1} e^{-j\frac{2\pi}{N}m\pi(k)} e^{j\frac{2\pi}{N}nk}$$

$$u(x) = \begin{cases} 1, & x > 0 \\ 0, & x \le 0 \end{cases}$$

where k, n and N are integers, and N denotes the number of interleaved DFT precoded symbols.

8. The first communication device according to claim 1, wherein the set of subcarriers in the DFT-s-OFDM signal is:

a set of contiguous subcarriers; or a set of equally spaced discontiguous subcarriers; or a set of non-equally spaced discontiguous subcarriers.

9. The first communication device according to claim 1, wherein the set of modulation symbols is generated based on a predetermined sequence.

10. The first communication device according to claim 9, wherein the predetermined sequence is a constant amplitude zero auto correlation sequence.

11. The first communication device according to claim 9, wherein the first communication device is configured to:

transform a first set of modulation symbols and at least one second set of modulation symbols based on the DFT to obtain a first set of DFT precoded symbols and a second set of DFT precoded symbols, wherein the first set of modulation symbols and the second set of modulation symbols are generated from the same predetermined sequence;

interleave the first set of DFT precoded symbols based on a first permutation polynomial to obtain a first set of interleaved DFT precoded symbols, and interleave the second set of DFT precoded symbols based on a second permutation polynomial to obtain a second set of interleaved DFT precoded symbols, wherein the first permutation polynomial and the second permutation polynomial are different permutation polynomials resulting in different permutations;

modulate the set of subcarriers in a DFT-s-OFDM signal with the first set of interleaved DFT precoded symbols to obtain a first communication signal comprising the first set of interleaved DFT precoded symbols, and modulate the set of subcarriers in a DFT-s-OFDM signal with the second set of interleaved DFT precoded symbols to obtain a second communication signal comprising the second set of interleaved DFT precoded symbols.

12. The first communication device according to claim 1, wherein a set of information bits are mapped to a subset of modulation symbols, wherein for each modulation symbol index m corresponding to a modulation symbol in the subset of modulation symbols, a value $$\sum_{n=0}^{N-1} u(|g[m, n]|)$$

is equal to or larger than a corresponding value for a modulation symbol index m not comprised in the subset of modulation symbols, where N is an integer denoting the number of interleaved DFT precoded symbols.

13. The first communication device according to claim 1, further configured to:

transmit a control message to the second communication device, the control message indicating the permutation polynomial or its inverse permutation polynomial.

14. A second communication device for a communication system, the second communication device comprising a non-transitory computer-readable storage medium storing a computer program that causes the second communication device to be configured to:

receive a communication signal from a first communication device, the communication signal comprising a set of interleaved discrete Fourier transform (DFT) precoded symbols modulated on a set of subcarriers in a DFT spread orthogonal frequency division multiplexing (DFT-s-OFDM) signal;

extract the set of interleaved DFT precoded symbols based on the set of subcarriers in the DFT-s-OFDM signal;

deinterleave the set of interleaved DFT precoded symbols based on an inverse permutation polynomial to obtain a set of deinterleaved DFT precoded symbols; and inverse transform the set of deinterleaved DFT precoded symbols based on an inverse DFT to obtain a set of modulation symbols.

15. The second communication device according to claim 14, wherein a degree of the inverse permutation polynomial is smaller than or equal to a degree of its associated permutation polynomial for interleaving the set of DFT precoded symbols.

16. The second communication device according to claim 14, further configured to receive a control message from the first communication device, the control message indicating the inverse permutation polynomial or its associated permutation polynomial for interleaving the set of DFT precoded symbols.

17. The second communication device according to claim 14, wherein the inverse permutation polynomial is a linear permutation polynomial or an irreducible quadratic permutation polynomial.

18. A method for a first communication device, the method comprising:

transforming a set of modulation symbols based on a discrete Fourier transform (DFT) to obtain a set of DFT precoded symbols;

interleaving the set of DFT precoded symbols based on a permutation polynomial to obtain a set of interleaved DFT precoded symbols;

modulating a set of subcarriers in a DFT spread orthogonal frequency division multiplexing (DFT-s-OFDM) signal with the set of interleaved DFT precoded symbols to obtain a communication signal comprising the set of interleaved DFT precoded symbols; and transmitting the communication signal to a second communication device wherein the permutation polynomial is permutation polynomial π(k), the permutation polynomial π(k) being expressed as $$\pi(k) = f(k)(\text{mod } N) \text{ with } f(k) = f_p k^p + f_{p-1} k^{p-1} + \cdots + f_0$$

where (mod N) is the modulo-N operator, k, p, $f_p$ and N are integers, where N denotes the number of interleaved DFT precoded symbols, and where the permutation polynomial π(k) is a p:th degree permutation polynomial permuting the values in the set {0, 1, . . . , N−1}.

* * * * *